United States Patent
Heo et al.

(10) Patent No.: US 12,483,744 B2
(45) Date of Patent: Nov. 25, 2025

(54) ELECTRONIC DEVICE FOR PERFORMING SYNCHRONIZATION OF VIDEO DATA AND AUDIO DATA, AND CONTROL METHOD THEREFOR

(71) Applicant: SAMSUNG ELECTRONICS CO., LTD., Suwon-si (KR)

(72) Inventors: Jin Heo, Suwon-si (KR); Wonki Kim, Suwon-si (KR); Hyejeong Park, Suwon-si (KR); Jiyoung Bang, Suwon-si (KR); Jaehyeon Jeong, Suwon-si (KR); Keunha Choi, Suwon-si (KR)

(73) Assignee: SAMSUNG ELECTRONICS CO., LTD., Gyeonggi-Do (KR)

( * ) Notice: Subject to any disclaimer, the term of this patent is extended or adjusted under 35 U.S.C. 154(b) by 244 days.

(21) Appl. No.: 18/190,981

(22) Filed: Mar. 28, 2023

(65) Prior Publication Data

US 2023/0232063 A1    Jul. 20, 2023

Related U.S. Application Data

(63) Continuation of application No. PCT/KR2021/013134, filed on Sep. 27, 2021.

(30) Foreign Application Priority Data

Sep. 28, 2020  (KR) .................. 10-2020-0126272

(51) Int. Cl.
*H04N 21/43*    (2011.01)
*H04N 21/41*    (2011.01)
(Continued)

(52) U.S. Cl.
CPC ......... *H04N 21/4307* (2013.01); *H04N 21/41* (2013.01); *H04N 21/4394* (2013.01); *H04N 21/44008* (2013.01)

(58) Field of Classification Search
CPC ............... H04N 21/4307; H04N 21/41; H04N 21/4394; H04N 21/44008
See application file for complete search history.

(56) References Cited

U.S. PATENT DOCUMENTS

| | | | |
|---|---|---|---|
| 2004/0019911 A1 | 1/2004 | Gates et al. | |
| 2007/0230913 A1 | 10/2007 | Ichimura | |

(Continued)

FOREIGN PATENT DOCUMENTS

| | | |
|---|---|---|
| JP | 2008-102974 A | 5/2008 |
| JP | 2012-511279 A | 5/2012 |

(Continued)

OTHER PUBLICATIONS

International Search Report mailed Feb. 21, 2022 for PCT/KR2021/013134.

(Continued)

*Primary Examiner* — Yassin Alata
(74) *Attorney, Agent, or Firm* — CANTOR COLBURN LLP

(57) ABSTRACT

An electronic device for use with an external electronic device includes a touchscreen display, at least one speaker, and at least one processor. The at least one processor may obtain a user input for outputting video data of a first medium while audio data of the first medium is output through the at least one speaker, identify a point of time when the audio data is output through the at least one speaker, based on the obtained user input, determine a point of time when the video data is to be output through the touchscreen display or an external electronic device, by a delay time calculated at least based on the identified point of time, and control the touchscreen display or the external (Continued)

electronic device such that the video data is output through the touchscreen display or the external electronic device at the determined point of time.

15 Claims, 23 Drawing Sheets

(51) Int. Cl.
*H04N 21/439* (2011.01)
*H04N 21/44* (2011.01)

(56) References Cited

U.S. PATENT DOCUMENTS

| | | | |
|---|---|---|---|
| 2008/0049139 A1 | 2/2008 | Nishiyama | |
| 2009/0033390 A1 | 2/2009 | Kim et al. | |
| 2012/0169837 A1 | 7/2012 | Olofsson et al. | |
| 2012/0224100 A1 | 9/2012 | Gha et al. | |
| 2015/0077633 A1 | 3/2015 | Lee et al. | |
| 2015/0213839 A1* | 7/2015 | Woodman | H04L 67/02 386/248 |
| 2018/0213014 A1 | 7/2018 | Kim et al. | |
| 2020/0076988 A1 | 3/2020 | Aides et al. | |

FOREIGN PATENT DOCUMENTS

| | | |
|---|---|---|
| JP | 2018-125891 A | 8/2018 |
| JP | 2020-48014 A | 3/2020 |
| KR | 10-2013-0087678 A | 8/2013 |
| KR | 10-2015-0030946 A | 3/2015 |
| KR | 10-2018-0086113 A | 7/2018 |
| KR | 20190056060 A | 5/2019 |

OTHER PUBLICATIONS

Korean Notice of Allowance for KR Application No. 10-2020-0126272 mailed on May 1, 2025.

* cited by examiner

ELECTRONIC DEVICE FOR PERFORMING SYNCHRONIZATION OF VIDEO DATA AND AUDIO DATA, AND CONTROL METHOD THEREFOR

This application is a continuation application of International Patent Application No. PCT/KR2021/013134, filed on Sep. 27, 2021, claiming priority to Korean Patent Application No. 10-2020-0126272, filed on Sep. 28, 2020, and all the benefits accruing therefrom under 35 U.S.C. § 119, the content of which in its entirety is herein incorporated by reference.

BACKGROUND

1. Field

The disclosure relates to an electronic device for synchronizing video data and audio data and a control method therefor.

2. Description of the Related Art

A growing number of diverse services and additional functions are provided through electronic devices, e.g., portable electronic devices including smartphones and wearable devices connected to smartphones. To increase the utility of electronic devices and to meet different users' needs, communication service providers or electronic device manufacturers are providing a wide range of functions and are competitively developing electronic devices differentiated from those of other companies. Accordingly, various functions provided through electronic devices are also becoming more sophisticated.

SUMMARY

FIG. 1A to FIG. 1F are views illustrating synchronization of video data and audio data according to a conventional art.

Referring to FIG. 1A to FIG. 1C, in a case of a medium (e.g., content) including both audio data and video data, a terminal according to the conventional art may obtain a request to output the video data while outputting only the audio data. A video frame may be decoded, and a specific time may be required due to a characteristic occurring when the decoded video frame is obtained. For example, to output a video at a 10-second position, video data at a 10-second position may need to be obtained by starting decoding from a sync frame (also referred to as a "key frame" herein). For example, when the position of the sync frame is 8 seconds and video data includes 30 images per second, a total of 60 images may need to be decoded. To this end, FIG. 1B shows that a time of 750 milliseconds (ms) is required. For example, due to the characteristic occurring when the decoded video frame is obtained, a time when the video data is output by the terminal and a time when the audio data is output by the terminal may be different. To synchronize these different times (e.g., to enable the difference in output time between the video data and the audio data to be within a threshold time (e.g., 40 ms)), as shown in FIG. 1C, the conventional terminal may transmit the video data together with the audio data at a time (10.75 seconds) at which the audio data is currently being output by dropping (e.g., not outputting through the terminal or discarding) video data. However, when the video data is dropped, a user may feel as if the video is output as being cut.

Referring to FIG. 1D to FIG. 1F, in a case of a medium including both audio data and video data, the terminal according to the conventional art may obtain a request to output the audio data while outputting only the video data. In a case of the audio data, unlike the video data described above, all frames of the audio data are sync frames, and a transfer to a specific position (e.g., an eight-second position) for decoding may not be needed. However, in the case of the audio data, various delay values may occur according to a characteristic of an audio data output device (e.g., a speaker of the terminal). FIG. 1E shows that a delay value occurring according to the characteristics of the audio data output device is 0.2 second. To synchronize the output time of the video data and the output time of the audio data, the terminal according to the conventional art temporarily stops outputting the video data, and then outputs the audio data and the video data together to synchronize with each other when the audio data is output up to the current output position of the video data. However, in this case, the user may feel as if output of a video is temporarily stopped.

In an embodiment of the disclosure, there is disclosed an electronic device for synchronizing audio data and video data by compensating for a delay time for outputting the video data when obtaining a request to output the video data while outputting only the audio data in a case of a medium including both the video data and the audio data.

In an embodiment of the disclosure, there is disclosed an electronic device for synchronizing audio data and video data by compensating for a delay time for outputting the audio data when obtaining a request to output the audio data while outputting only the video data in a case of a medium including both the video data and the audio data.

In an embodiment of this document, there is disclosed an electronic device capable of performing accurate synchronization by correcting an error when the error occurs in a process of synchronizing audio data and video data.

An electronic device in an embodiment of the disclosure may include a touchscreen display, at least one speaker, and at least one processor. The at least one processor may obtain a user input to output video data of a first medium while outputting audio data of the first medium through the at least one speaker, identify a time when the audio data is output through the at least one speaker, based on the obtained user input, calculate a time when the video data is to be output through the touchscreen display or an external electronic device, at least based on an identified time, and control the touchscreen display or the external electronic device such that the video data is output through the touchscreen display or the external electronic device at a determined time, based on the calculated time.

An electronic device in an embodiment of the disclosure may include a touchscreen display, at least one speaker, and at least one processor. The at least one processor may obtain a user input to output audio data of a first medium while outputting video data of the first medium through the touchscreen display, identify a time when the video data is output through the touchscreen display, based on the obtained user input, calculate a time when the audio data is to be output through the at least one speaker or an external electronic device, output the video data through the touchscreen display, based on the identified time and the calculated time, and control the at least one speaker or the external electronic device such that the audio data is output through the at least one speaker or the external electronic device.

An electronic device in an embodiment of the disclosure may include at least one speaker and at least one processor. The at least one processor may identify an output time of audio data of a first medium determined based on a delay time; select a frame of the audio data corresponding to the output time, the frame including a plurality of pieces of pulse-code modulation (PCM) audio data; obtain a first comparison result of comparing the output time and an output time of the selected frame; obtain a second comparison result of comparing a sum of the output time of the selected frame and a size of the frame with the output time, and drop the selected frame in response to the obtained second comparison result when the output time is later than the sum of the output time of the selected frame and the size of the frame, in response to the obtained first comparison result when the output time is later than the output time of the selected frame; and calculate a difference between the output time and the output time of the selected frame, drop at least one piece of PCM audio data corresponding to a calculation result among the plurality of pieces of PCM audio data, and transmit remaining PCM audio data other than the dropped PCM audio data among the plurality of pieces of PCM audio data to the at least one speaker or an external electronic device, in response to the obtained first comparison result when the output time is earlier than or equal to the output time of the selected frame.

In an embodiment of the disclosure, in a case of a medium including both video data and audio data, when a request to output the video data is obtained while only the audio data is output, it is possible to synchronize the audio data and the video data by compensating for a delay time for outputting the video data.

In an embodiment of the disclosure, in a case of a medium including both video data and audio data, when a request to output the audio data is obtained while only the video data is output, it is possible to synchronize the audio data and the video data by compensating for a delay time for outputting the audio data.

In an embodiment of this document, when an error occurs in a process of synchronizing audio data and video data, it is possible to perform accurate synchronization by correcting the error.

BRIEF DESCRIPTION OF DRAWINGS

The above and other exemplary embodiments, advantages and features of this disclosure will become more apparent by describing in further detail exemplary embodiments thereof with reference to the accompanying drawings, in which.

DETAILED DESCRIPTION

Figure 1A:
FIG. 1A to FIG. 1F are views illustrating synchronization of video data and audio data according to a conventional art.
Figure 1B:
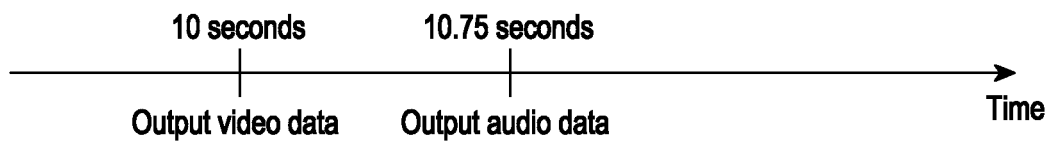
Figure 1C:
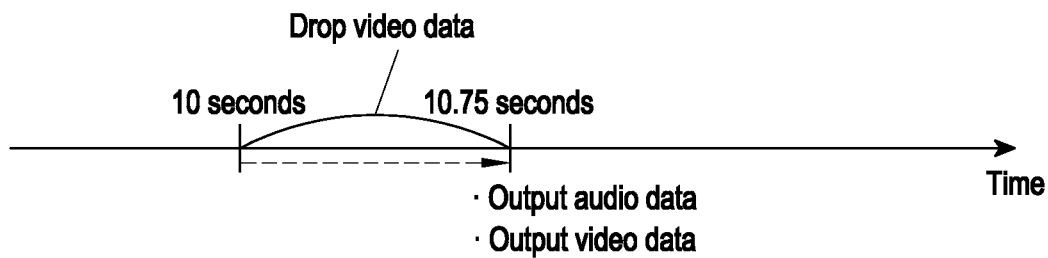
Figure 1D:
Figure 1E:
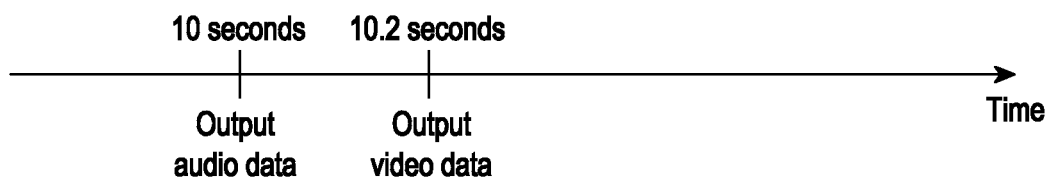
Figure 1F:
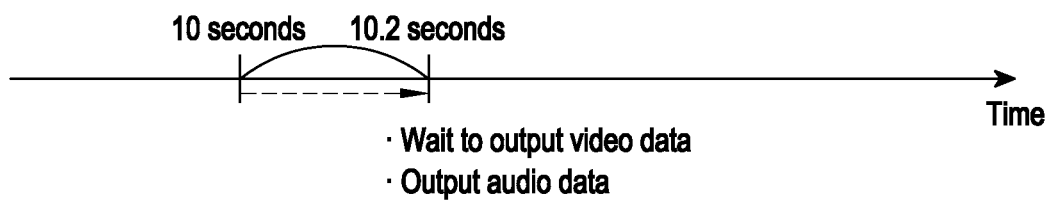

The invention now will be described more fully hereinafter with reference to the accompanying drawings, in which various embodiments are shown. This invention may, however, be embodied in many different forms, and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present therebetween. In contrast, when an element is referred to as being "directly on" another element, there are no intervening elements present.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. For example, if the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, if the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). The term such as "about" can mean within one or more standard deviations, or within ±30%, 20%, 10%, 5% of the stated value, for example.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Figure 2:
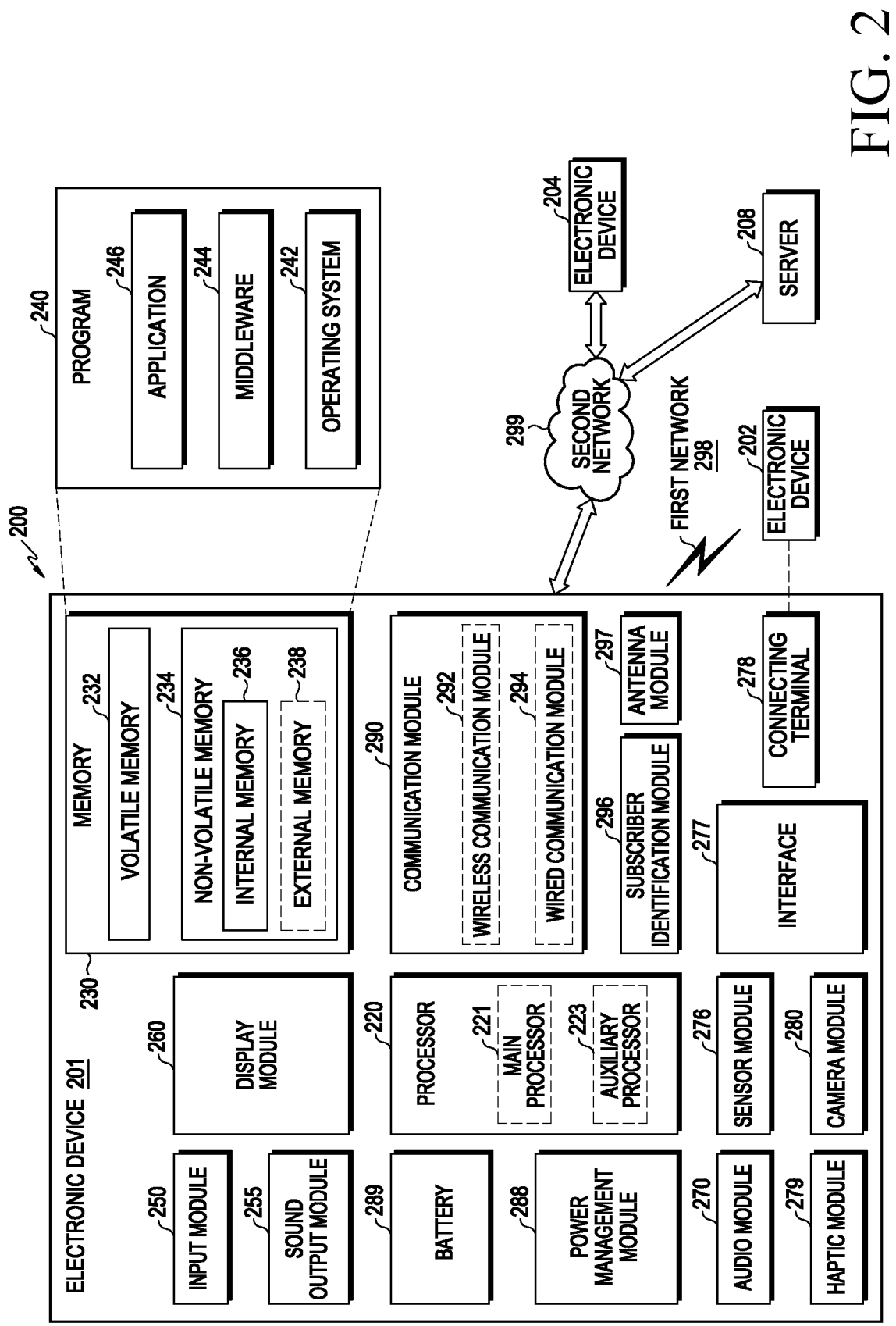
FIG. 2 is a block diagram of embodiments of an electronic device in a network environment.

FIG. 2 is a block diagram illustrating an electronic device 201 in a network environment 200 according to various embodiments.

Referring to FIG. 2, the electronic device 201 in the network environment 200 may communicate with an electronic device 202 via a first network 298 (e.g., a short-range wireless communication network), or an electronic device 204 or a server 208 via a second network 299 (e.g., a long-range wireless communication network). According to an embodiment, the electronic device 201 may communicate with the electronic device 204 via the server 208. According to an embodiment, the electronic device 201 may include a processor 220, memory 230, an input module 250, a sound output module 255, a display module 260, an audio module 270, a sensor module 276, an interface 277, a connecting terminal 278, a haptic module 279, a camera module 280, a power management module 288, a battery 289, a communication module 290, a subscriber identification module (SIM) 296, or an antenna module 297. In some embodiments, at least one of the components (e.g., the connecting terminal 278) may be omitted from the electronic device 201, or one or more other components may be added in the electronic device 201. In some embodiments, some of the components (e.g., the sensor module 276, the camera module 280, or the antenna module 297) may be implemented as a single component (e.g., the display module 260).

The processor 220 may execute, for example, software (e.g., a program 240) to control at least one other component (e.g., a hardware or software component) of the electronic device 201 coupled with the processor 220, and may perform various data processing or computation. According to one embodiment, as at least part of the data processing or computation, the processor 220 may store a command or data received from another component (e.g., the sensor module 276 or the communication module 290) in volatile memory 232, process the command or the data stored in the volatile memory 232, and store resulting data in non-volatile memory 234. According to an embodiment, the processor 220 may include a main processor 221 (e.g., a central processing unit (CPU) or an application processor (AP)), or an auxiliary processor 223 (e.g., a graphics processing unit (GPU), a neural processing unit (NPU), an image signal processor (ISP), a sensor hub processor, or a communication processor (CP)) that is operable independently from, or in conjunction with, the main processor 221. For example, when the electronic device 201 includes the main processor 221 and the auxiliary processor 223, the auxiliary processor 223 may be adapted to consume less power than the main processor 221, or to be specific to a specified function. The auxiliary processor 223 may be implemented as separate from, or as part of the main processor 221.

The auxiliary processor 223 may control, for example, at least some of functions or states related to at least one component (e.g., the display module 260, the sensor module 276, or the communication module 290) among the components of the electronic device 201, instead of the main processor 221 while the main processor 221 is in an inactive (e.g., sleep) state, or together with the main processor 221 while the main processor 221 is in an active (e.g., executing an application) state. According to an embodiment, the auxiliary processor 223 (e.g., an ISP or a CP) may be implemented as part of another component (e.g., the camera module 280 or the communication module 290) functionally related to the auxiliary processor 223. According to an embodiment, the auxiliary processor 223 (e.g., the NPU) may include a hardware structure specified for artificial intelligence model processing. An artificial intelligence model may be generated by machine learning. Such learning may be performed, e.g., by the electronic device 201 where the artificial intelligence is performed or via a separate server (e.g., the server 208). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent DNN (BRDNN), deep Q-network or a combination of two or more thereof but is not limited thereto. The artificial intelligence model may, additionally or alternatively, include a software structure other than the hardware structure.

The memory 230 may store various data used by at least one component (e.g., the processor 220 or the sensor module 276) of the electronic device 201. The various data may include, for example, software (e.g., the program 240) and input data or output data for a command related thereto. The memory 230 may include the volatile memory 232 or the non-volatile memory 234.

The program 240 may be stored in the memory 230 as software, and may include, for example, an operating system (OS) 242, middleware 244, or an application 246.

The input module 250 may receive a command or data to be used by another component (e.g., the processor 220) of the electronic device 201, from the outside (e.g., a user) of the electronic device 201. The input module 250 may include, for example, a microphone, a mouse, a keyboard, a key (e.g., a button), or a digital pen (e.g., a stylus pen).

The sound output module 255 may output sound signals to the outside of the electronic device 201. The sound output module 255 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 260 may visually provide information to the outside (e.g., a user) of the electronic device 201. The display module 260 may include, for example, a display, a hologram device, or a projector and control circuitry to control a corresponding one of the display, hologram device, and projector. According to an embodiment, the display module 260 may include a touch sensor adapted to detect a touch, or a pressure sensor adapted to measure the intensity of force incurred by the touch.

The audio module 270 may convert a sound into an electrical signal and vice versa. According to an embodiment, the audio module 270 may obtain the sound via the input module 250, or output the sound via the sound output module 255 or an external electronic device (e.g., an electronic device 202 (e.g., a speaker or a headphone)) directly or wirelessly coupled with the electronic device 201.

The sensor module 276 may detect an operational state (e.g., power or temperature) of the electronic device 201 or an environmental state (e.g., a state of a user) external to the electronic device 201, and then generate an electrical signal or data value corresponding to the detected state. According to an embodiment, the sensor module 276 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 277 may support one or more specified protocols to be used for the electronic device 201 to be coupled with the external electronic device (e.g., the electronic device 202) directly or wirelessly. According to an embodiment, the interface 277 may include, for example, a high definition multimedia interface (HDMI), a universal serial bus (USB) interface, a secure digital (SD) card interface, or an audio interface.

A connecting terminal 278 may include a connector via which the electronic device 201 may be physically connected with the external electronic device (e.g., the electronic device 202). According to an embodiment, the connecting terminal 278 may include, for example, an HDMI connector, a USB connector, an SD card connector, or an audio connector (e.g., a headphone connector).

The haptic module 279 may convert an electrical signal into a mechanical stimulus (e.g., a vibration or a movement) or electrical stimulus which may be recognized by a user via his tactile sensation or kinesthetic sensation. According to an embodiment, the haptic module 279 may include, for example, a motor, a piezoelectric element, or an electric stimulator.

The camera module 280 may capture a still image or moving images. According to an embodiment, the camera module 280 may include one or more lenses, image sensors, ISPs, or flashes.

The power management module 288 may manage power supplied to the electronic device 201. According to one embodiment, the power management module 288 may be implemented as at least part of, for example, a power management integrated circuit (PMIC).

The battery 289 may supply power to at least one component of the electronic device 201. According to an embodiment, the battery 289 may include, for example, a primary cell which is not rechargeable, a secondary cell which is rechargeable, or a fuel cell.

The communication module 290 may support establishing a direct (e.g., wired) communication channel or a wireless communication channel between the electronic device 201 and the external electronic device (e.g., the electronic device 202, the electronic device 204, or the server 208) and performing communication via the established communication channel. The communication module 290 may include one or more CPs that are operable independently from the processor 220 (e.g., the AP) and supports a direct (e.g., wired) communication or a wireless communication. According to an embodiment, the communication module 290 may include a wireless communication module 292 (e.g., a cellular communication module, a short-range wireless communication module, or a global navigation satellite system (GNSS) communication module) or a wired communication module 294 (e.g., a local area network (LAN) communication module or a power line communication (PLC) module). A corresponding one of these communication modules may communicate with the external electronic device 204 via the first network 298 (e.g., a short-range communication network, such as Bluetooth™, wireless-fidelity (Wi-Fi) direct, or infrared data association (IrDA)) or the second network 299 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 292 may identify or authenticate the electronic device 201 in a communication network, such as the first network 298 or the second network 299, using subscriber information (e.g., international mobile subscriber identity (IMSI)) stored in the SIM 296.

The wireless communication module 292 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 292 may support a high-frequency band (e.g., the mmWave band) to achieve, e.g., a high data transmission rate. The wireless communication module 292 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 292 may support various requirements specified in the electronic device 201, an external electronic device (e.g., the electronic device 204), or a network system (e.g., the second network 299). According to an embodiment, the wireless communication module 292 may support a peak data rate (e.g., 20 Gbps or more) for implementing eMBB, loss coverage (e.g., 164 dB or less) for implementing mMTC, or U-plane latency (e.g., 0.5 millisecond (ms) or less for each of downlink (DL) and uplink (UL), or a round trip of 1 ms or less) for implementing URLLC.

The antenna module 297 may transmit or receive a signal or power to or from the outside (e.g., the external electronic device) of the electronic device 201. According to an embodiment, the antenna module 297 may include an antenna including a radiating element composed of a conductive material or a conductive pattern formed in or on a substrate (e.g., a printed circuit board (PCB)). According to an embodiment, the antenna module 297 may include a plurality of antennas (e.g., array antennas). In such a case, at least one antenna appropriate for a communication scheme used in the communication network, such as the first network 298 or the second network 299, may be selected, for example, by the communication module 290 from the plurality of antennas. The signal or the power may then be transmitted or received between the communication module 290 and the external electronic device via the selected at least one antenna. According to an embodiment, another component (e.g., a radio frequency integrated circuit (RFIC)) other than the radiating element may be additionally formed as part of the antenna module 297.

According to various embodiments, the antenna module 297 may form a mmWave antenna module. According to an embodiment, the mmWave antenna module may include a PCB, an RFIC disposed on a first surface (e.g., the bottom surface) of the PCB, or adjacent to the first surface and capable of supporting a designated high-frequency band (e.g., the mmWave band), and a plurality of antennas (e.g., array antennas) disposed on a second surface (e.g., the top or a side surface) of the PCB, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 201 and the external electronic device 204 via the server 208 coupled with the second network 299. Each of the external electronic devices 202 or 204 may be a device of a same type as, or a different type, from the electronic device 201. According to an embodiment, all or some of operations to be executed at the electronic device 201 may be executed at one or more of the external electronic devices 202, 204, or 208. For example, if the electronic device 201 should perform a function or a service automatically, or in response to a request from a user or another device, the electronic device 201, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 201. The electronic device 201 may provide the outcome, with or without further processing of the outcome, as at least part of a reply to the request. To that end, a cloud computing, distributed computing, mobile edge computing (MEC), or client-server computing technology may be used, for example. The electronic device 201 may provide ultra low-latency services using, e.g., distributed computing or MEC. In another embodiment, the external electronic device 204 may include an internet-of-things (IoT) device. The server 208 may be an intelligent server using machine learning and/or a neural network. According to an embodiment, the external electronic device 204 or the server 208 may be included in the second network 299. The electronic device 201 may be applied to intelligent services (e.g., smart home, smart city, smart car, or healthcare) based on 5G communication technology or IoT-related technology.

FIG. 3A to FIG. 3E are views illustrating a function or operation of synchronizing audio data and video data.

Figure 3A:
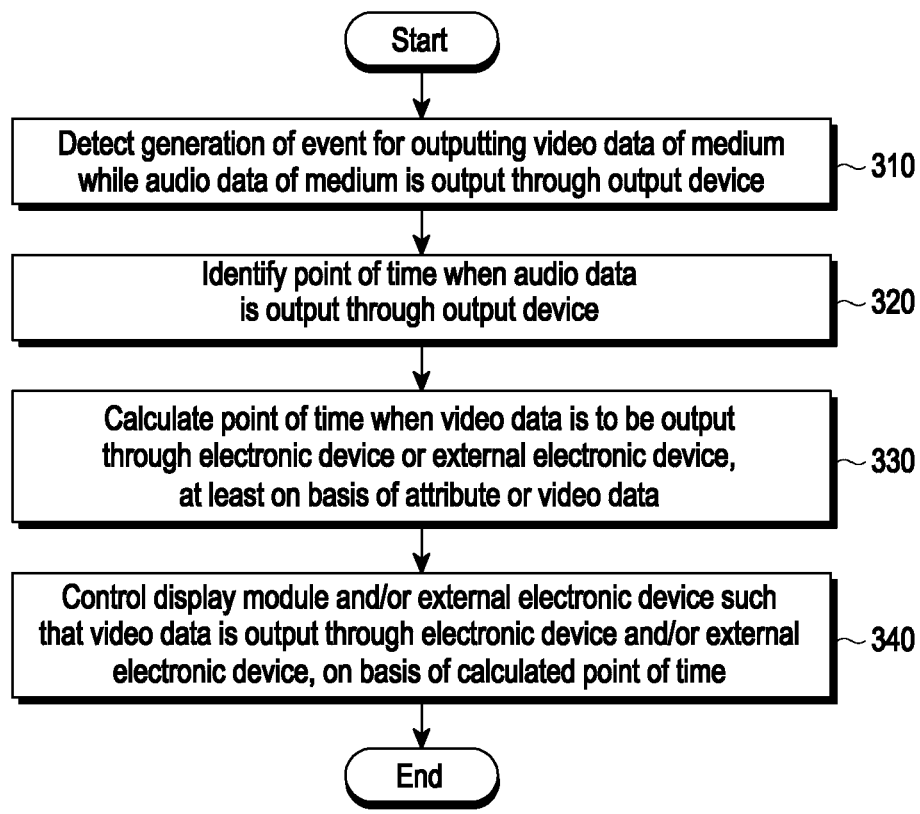
FIG. 3A to FIG. 3E are views illustrating embodiments of a function or operation of synchronizing audio data and video data.
Figure 3B:
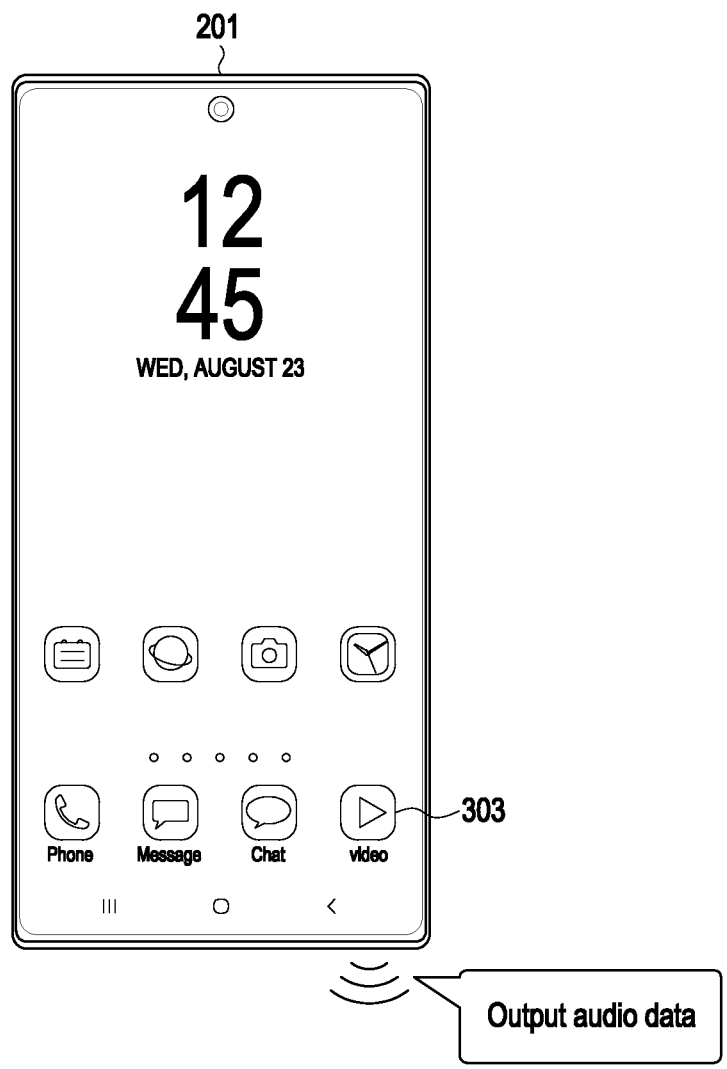
Figure 3C:
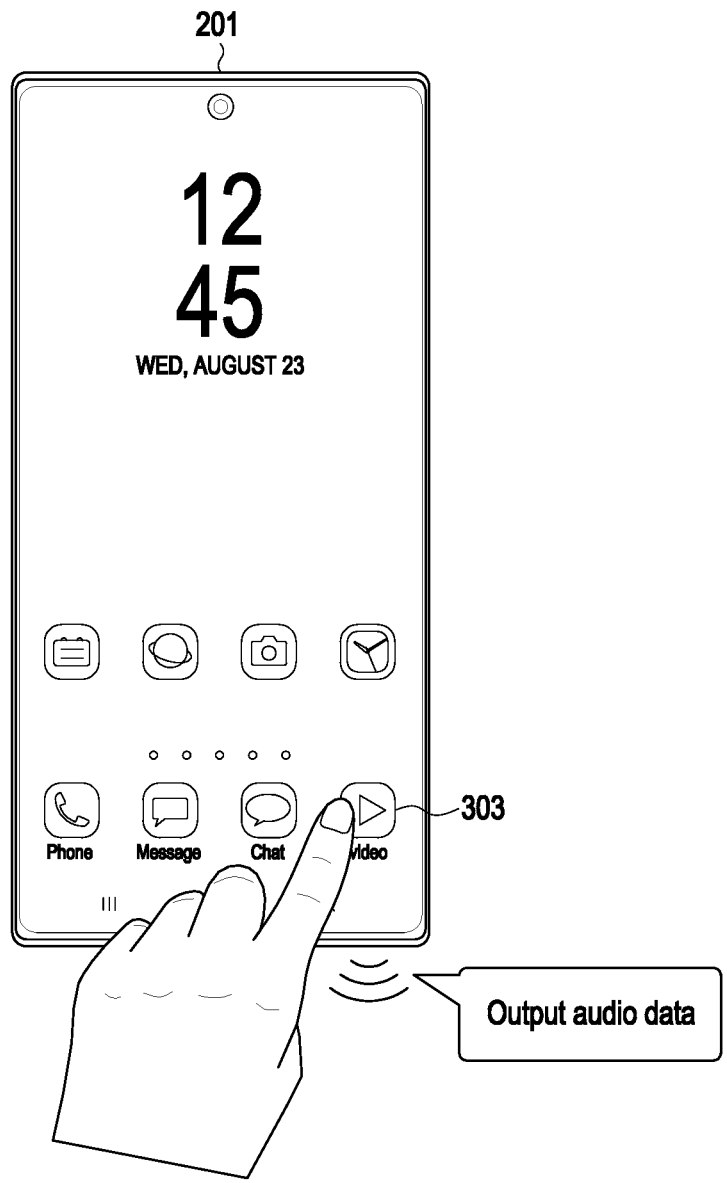
Figure 3D:
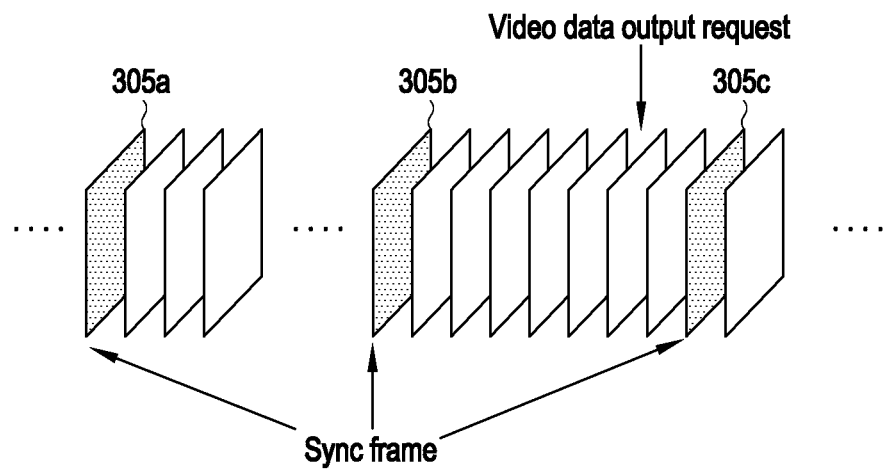

Referring to FIG. 3A, in operation 310, an electronic device (e.g., the electronic device 201 including the processor 220 of FIG. 2) in an embodiment of the disclosure may detect occurrence of an event for outputting video data of a medium (e.g., content) while outputting audio data of the medium through an output device (e.g., the sound output module (also referred to as the audio output module) 255 or an external audio output device). In an embodiment of the disclosure, as shown in FIG. 3B, the electronic device 201 may output only the audio data without outputting the video data. In an embodiment, the electronic device 201 may output only the audio data of the medium while displaying a predetermined screen (e.g., a home screen) rather than an output screen of the video data, for example. In an alternative embodiment, with an execution screen of a predetermined application (e.g., a gallery application) displayed on the electronic device 201, the electronic device 201 may output only the audio data of the medium without outputting the video data of the medium. As shown in FIG. 3C, the electronic device 201 in an embodiment of the disclosure may detect occurrence of an event (e.g., a user input) to output the video data of the medium, such as an input to select a predetermined application 303 (e.g., a video application) for playing the medium.

In operation 320, the electronic device (e.g., the electronic device 201 including the processor 220 of FIG. 2) in an embodiment of the disclosure may identify a time when the audio data is being output through the output device. In an embodiment, when the event is detected at a time after a lapse of 10 seconds from an initial playback start time (e.g., 0 second) of the medium, the electronic device 201 in an embodiment of the disclosure may identify the time when the audio data is being output through the output device as being "10 seconds", for example.

In operation 330, the electronic device (e.g., the electronic device 201 including the processor 220 of FIG. 2) in an embodiment of the disclosure may calculate a time when the video data is to be output through the electronic device 201 or an external electronic device, at least based on an attribute of the video data. The electronic device in an embodiment of the disclosure may determine a first delay time, a second delay time, a third delay time, and a fourth delay time to calculate the time when the video data is to be output through the electronic device 201 or the external electronic device.

The first delay time in an embodiment of the disclosure may be determined based on a time corresponding to a position of a previous sync frame closest to a time when the audio data is currently being output through at least one speaker or the external electronic device, a maximum frames per second (FPS) of a decoder for decoding the video data, an FPS of the video data, and the time when the audio data is being output through the at least one speaker or the external electronic device. The electronic device 201 in an embodiment of the disclosure may determine the first delay time by Equation 1 below.

$$((\text{Audio pos} - \text{Video prev sync pos}) \times \text{Video fps}) / \text{Decoder max fps} \quad \text{[Equation 1]}$$

In Equation 1, "Audio pos" may denote the time when the audio data is being output through the at least one speaker or the external electronic device, and "Video prev sync pos" may denote the time corresponding to the position of the previous sync frame closest to the time when the audio data is currently being output through the at least one speaker or the external electronic device. In an embodiment, referring to FIG. 3D, the electronic device 201 in an embodiment of the disclosure may select a previous sync frame 305b closest to the time when the audio data is currently being output through the at least one speaker or the external electronic device from among a plurality of sync frames 305a, 305b, and 305c, and may identify an output time (e.g., eight seconds) of the sync frame 305b. Further, in Equation 1, "Video fps" may denote the FPS of the video data, and "decoder max fps" may denote the maximum FPS of the decoder for decoding the video data. Information about the maximum FPS of the decoder in an embodiment of the disclosure may be stored in the electronic device 201 in the form of Table 1 below. In Table 1, width and height may denote the width and height of an image frame forming the video data. The electronic device 201 in an embodiment of the disclosure may determine the maximum FPS of the decoder by referring to the information in Table 1.

TABLE 1

| Decoder type | Width * height | max fps |
|---|---|---|
| h.264 | 921600 | 960 |
|  | 2073600 | 480 |
|  | 8294400 | 120 |

The second delay time in an embodiment of the disclosure may be determined based on a delay time of at least one video filter applied to the video data. Information about a video filter type and a delay time in an embodiment of the disclosure may be stored in the electronic device 201 in the form of Table 2 below. The electronic device 201 in an embodiment of the disclosure may determine a delay time (e.g., the second delay time) corresponding to the video filter applied to the video data by referring to the information shown in Table 2. When a plurality of video filters is used to output the video data, the electronic device 201 in an embodiment of the disclosure may determine the second delay time by calculating the sum of delay times corresponding to the types of the used video filter. Table 2 in an embodiment of the disclosure shows that different delay times may be applied depending on the width and height of an image frame forming the video data even though the same video filter type is used.

TABLE 2

| Video filter type | Width * height | Delay time |
|---|---|---|
| Object Tracking | 921600 | 20 ms |
|  | 2073600 | 40 ms |
| Stabilization | 921600 | 50 ms |
|  | 2073600 | 100 ms |
| Remove Flicker | 921600 | 30 ms |
|  | 2073600 | 60 ms |
| Super Resolution | 921600 | 50 ms |
|  | 2073600 | 100 ms |

The third delay time in an embodiment of the disclosure may be determined based on a video data transmission delay time demanded for a display module 260 of the electronic device 201 or the external electronic device to output the video data. The video data transmission delay time in an embodiment of the disclosure may denote a time (in other words, an output delay time) demanded when the video data is transmitted to a video output device. The electronic device 201 in an embodiment of the disclosure may determine the video data transmission delay time (e.g., the third delay time) by referring to information shown in Table 3 below.

TABLE 3

| Video output device | Delay time |
|---|---|
| Terminal display | 20 ms |
| Screen mirroring | 200 ms |
| AR glass | 300 ms |
| VR | 400 ms |

The fourth delay time in an embodiment of the disclosure may be a delay time for compensating for a delay time occurring when calculating the first delay time, the second delay time, and the third delay time. The electronic device 201 in an embodiment of the disclosure may determine the fourth delay time by Equation 2 below.

$$((\text{First delay time}+\text{Second delay time}+\text{Third delay time})\times\text{Video fps})/\text{Decoder max fps} \quad \text{[Equation 2]}$$

In Equation 2, "Video fps" may denote the FPS of the video data, and "decoder max fps" may denote the maximum FPS of the decoder for decoding the video data.

Figure 3E:
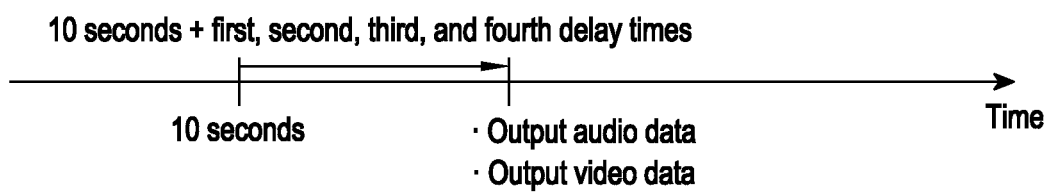

The electronic device 201 in an embodiment of the disclosure may calculate the time when the video data is to be output through the electronic device 201 or the external electronic device by Equation 3 below. The electronic device 201 in an embodiment of the disclosure may determine a time calculated by Equation 3 as the time when the video data is to be output. Referring to FIG. 3E, video data positioned at a time in which the delay times are reflected from a time when a request to output video data is obtained (e.g., the time after a lapse of 10 seconds from the initial time (0 second) of the medium) may be determined as an output frame, thereby making it possible to seamlessly output the video data. However, when the time calculated by Equation 3 is greater than a next sync frame, the electronic device 201 in an embodiment of the disclosure may determine a time corresponding to the position of the next sync frame as the time when the video data is to be output.

$$\text{Current output time of audio data}+\text{First delay time}+\text{Second delay time}+\text{Third delay time}+\text{Fourth delay time} \quad \text{[Equation 3]}$$

In operation 340, the electronic device 201 in an embodiment of the disclosure may control the display module 260 and/or the external electronic device to output the video data through the electronic device 201 and/or the external electronic device, based on the calculated time. Through this operation, the video data positioned at the time in which the delay times are reflected from the time when the request to output video data is obtained (e.g., the time after a lapse of 10 seconds from the initial time (0 second) of the medium) may be determined as the output frame, thereby making it possible to seamlessly output the video data.

FIG. 4A to FIG. 4H are views illustrating a predetermined example to which the function or operation described with reference to FIG. 3A to FIG. 3F is applicable.

Figure 4A:
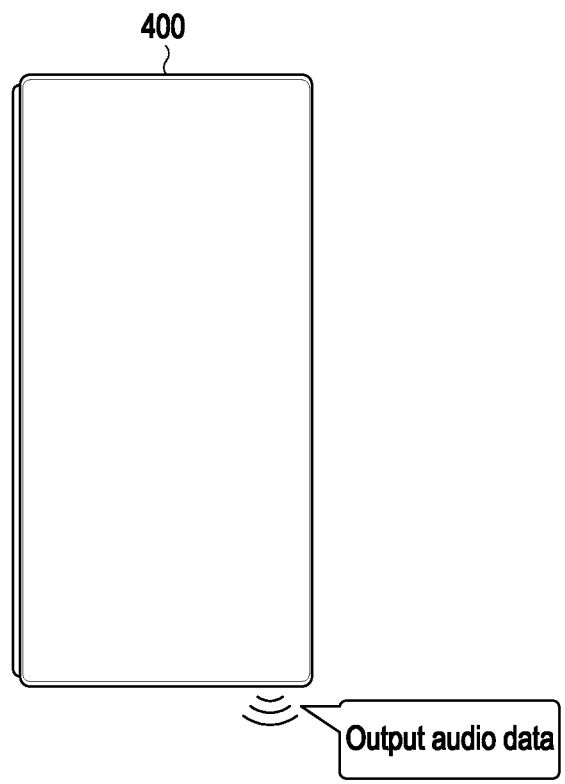
FIG. 4A to FIG. 4H are views illustrating a predetermined example to which the function or operation described with reference to FIG. 3A to FIG. 3F is applicable.
Figure 4B:
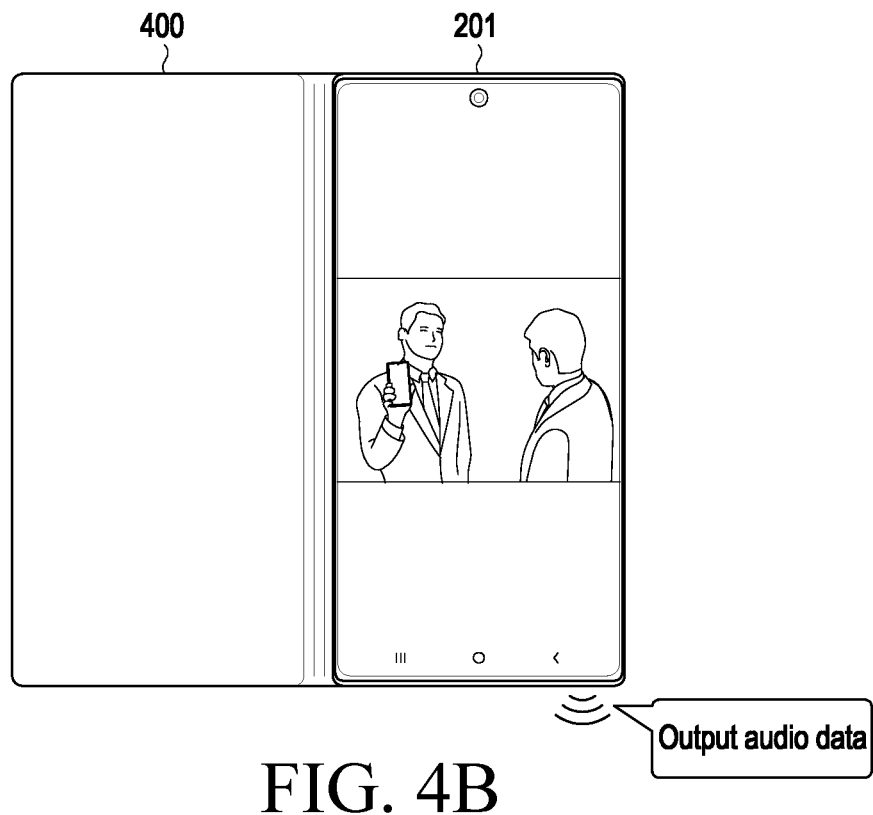

Referring to FIG. 4A and FIG. 4B, an electronic device 201 in an embodiment of the disclosure may be combined with a cover 400. When the cover 400 is in a state of being closed (e.g., FIG. 4A), the electronic device 201 in an embodiment of the disclosure may output only audio data of a medium. Then, as shown in FIG. 4B, when the cover 400 is changed to be in an open state, the electronic device 201 in an embodiment of the disclosure may identify the change to the open state as a video data output request. The electronic device 201 in an embodiment of the disclosure may output video data in consideration of the foregoing delay times, thereby seamlessly outputting the video data. In an alternative embodiment, according to the disclosure, while a screen (e.g., the display module 260 of FIG. 2) is in an off state (e.g., a sleep state of an AP) or is in a low-power state (e.g., an always-on-display (AOD) state), the electronic device 201 may output only audio data. In this case, the screen may be turned on (e.g., switched to a wake-up state of the AP) or released from the low-power state) according to a user's input to turn on the screen of the electronic device 201 (e.g., a touch/press input to a button provided on the electronic device 201) or occurrence of an event for turning on the screen (e.g., occurrence of an incoming call or reception of a message). When the screen is turned on, the electronic device 201 in an embodiment of the disclosure may output video data together with audio data, and may output the video data in consideration of the foregoing delay times, making it possible to seamlessly output the video data.

Figure 4C:
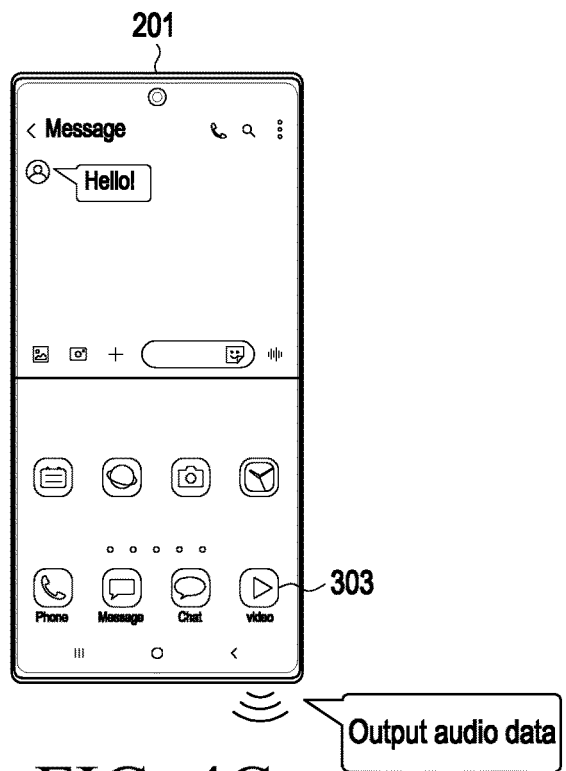
Figure 4D:
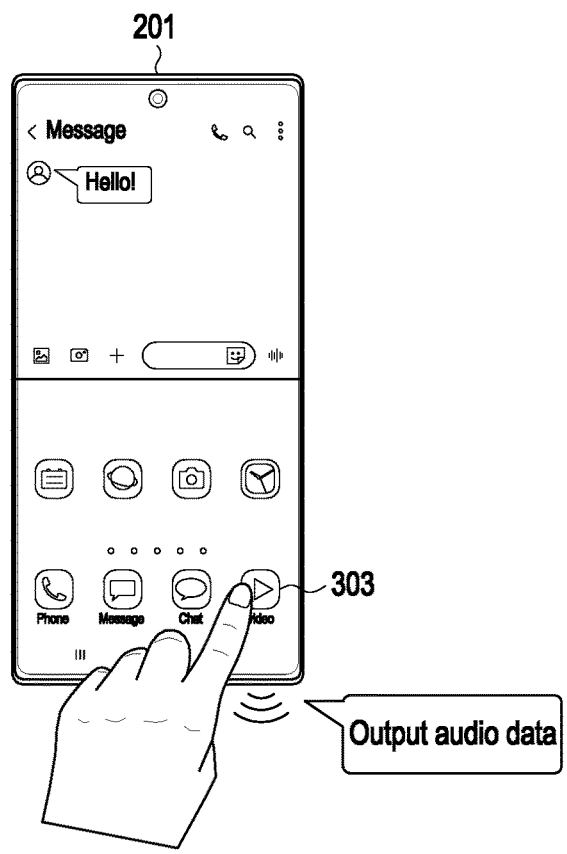
Figure 4E:
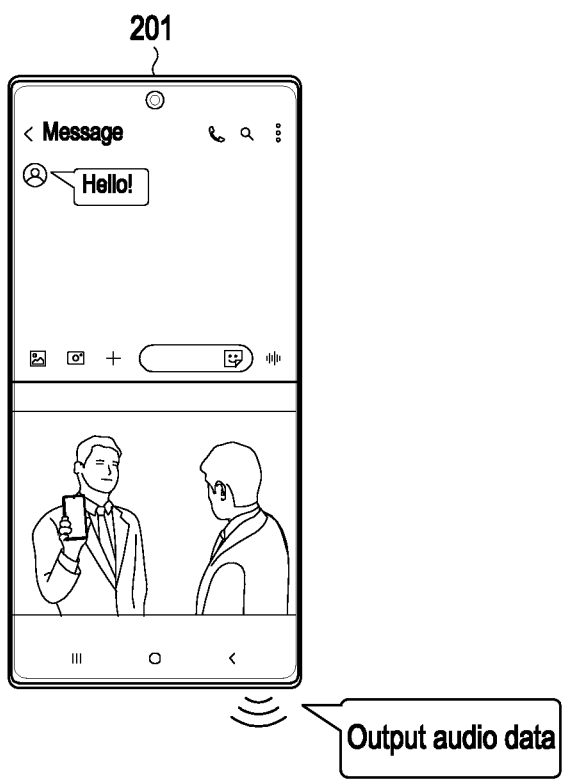

In an embodiment of the disclosure, the function or the operation related to FIG. 3A to FIG. 3E may also be applied in a multi-window environment or an environment in which the electronic device 201 includes a plurality of screens. Referring to FIG. 4C to FIG. 4E, in a state in which a plurality of application execution screens is displayed in a multi-window display mode as shown in FIG. 4C, only audio data of a medium may be output. When obtaining a user input to request output of video data as shown in FIG. 4D, the electronic device 201 in various embodiments of the disclosure may output audio data together with the video data as shown in FIG. 4E. Here, the electronic device 201 in various embodiments of the disclosure may output the video data in consideration of the foregoing delay times, thereby seamlessly outputting the video data.

Figure 4F:
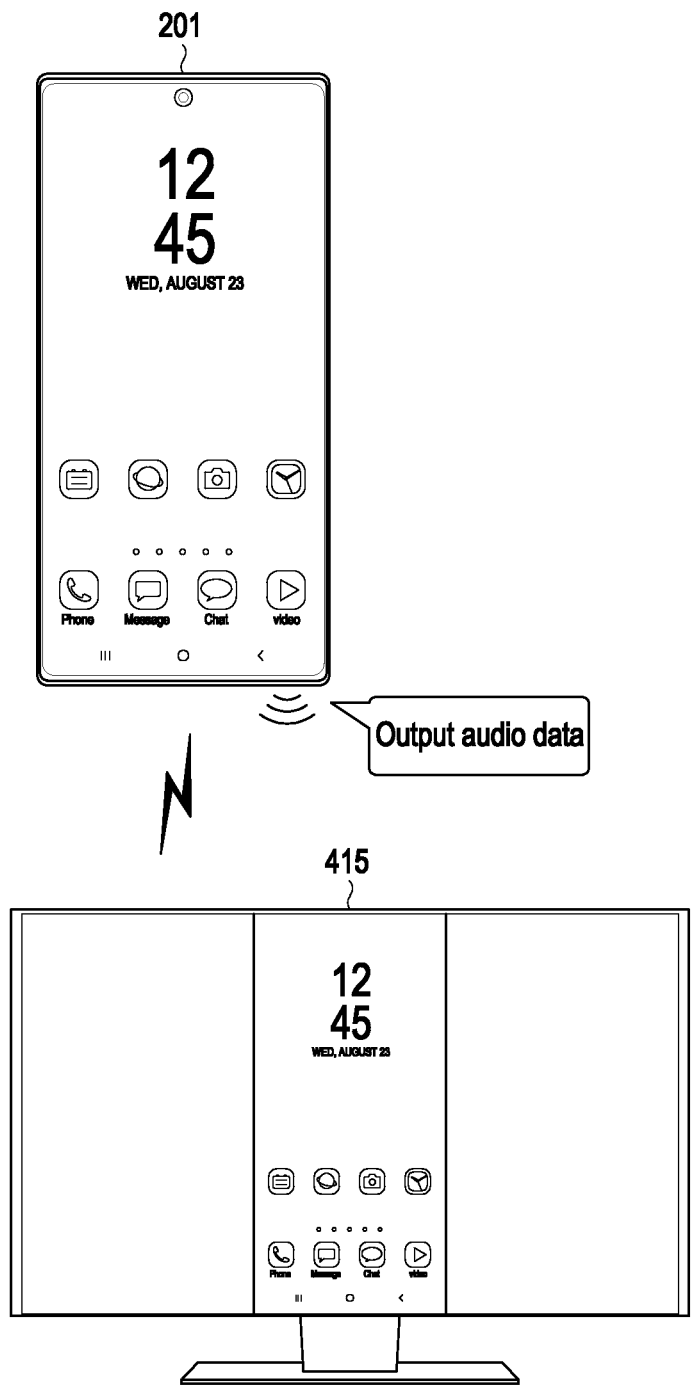
Figure 4G:
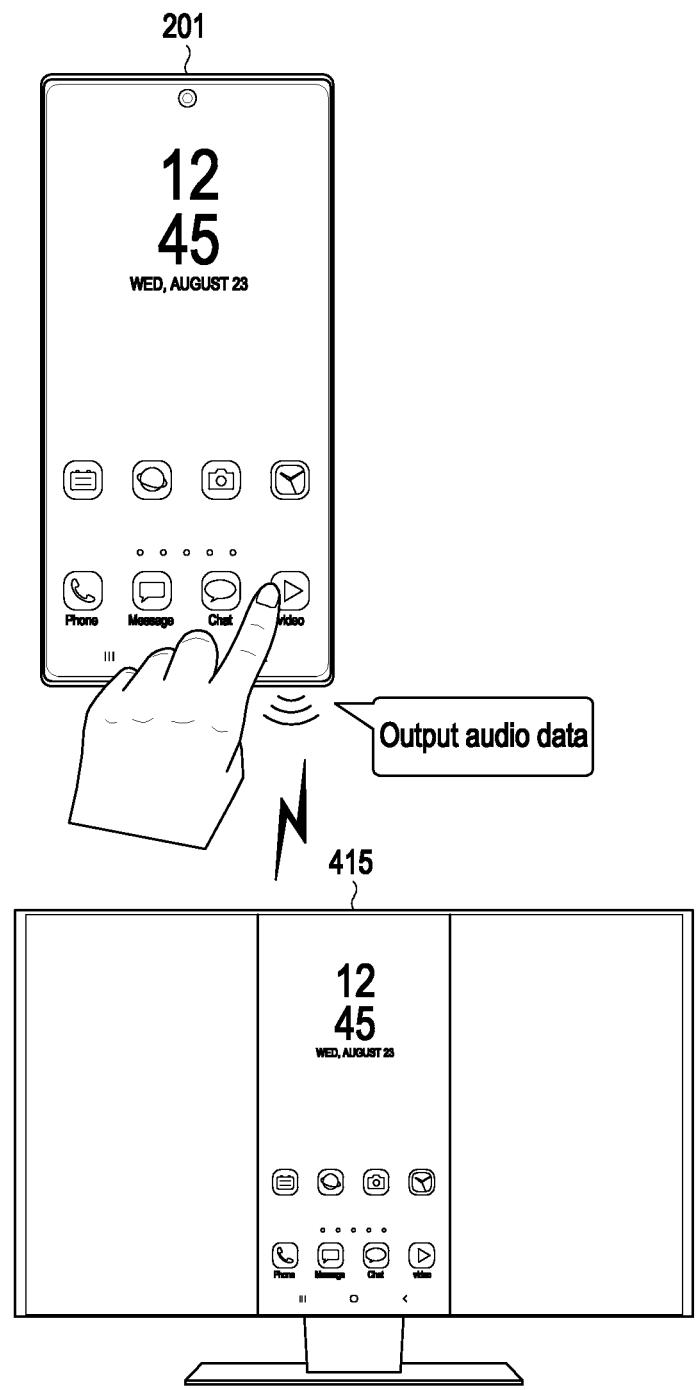
Figure 4H:
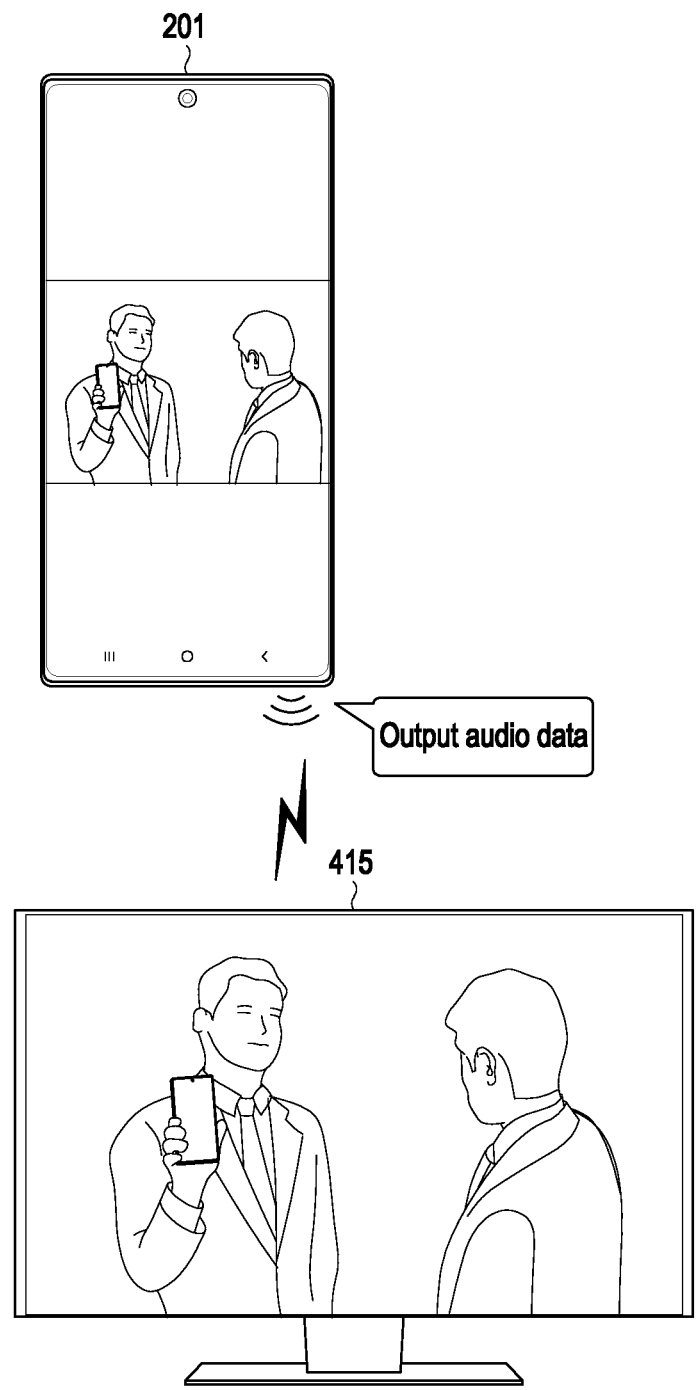

In an embodiment of the disclosure, the function or the operation related to FIG. 3A to FIG. 3E may also be applied when mirroring with an external electronic device 415 (refer to FIGS. 4F to 4H) is performed. Referring to FIG. 4F, the electronic device 201 in an embodiment of the disclosure may control the external electronic device 415 to display a screen displayed on the electronic device 201 on the external electronic device 415 while outputting audio data. In this case, when obtaining a user input to request output of video data as shown in FIG. 4G, the electronic device 201 in various embodiments of the disclosure may output audio data together with the video data through the electronic device 201 and the external electronic device 415 as shown in FIG. 4H. Here, the electronic device 201 in an embodiment of the disclosure may output video data in consideration of the foregoing delay times, thereby seamlessly outputting the video data.

FIG. 5A to FIG. 5E are views illustrating a function or operation of synchronizing audio data and video data.

Figure 5A:
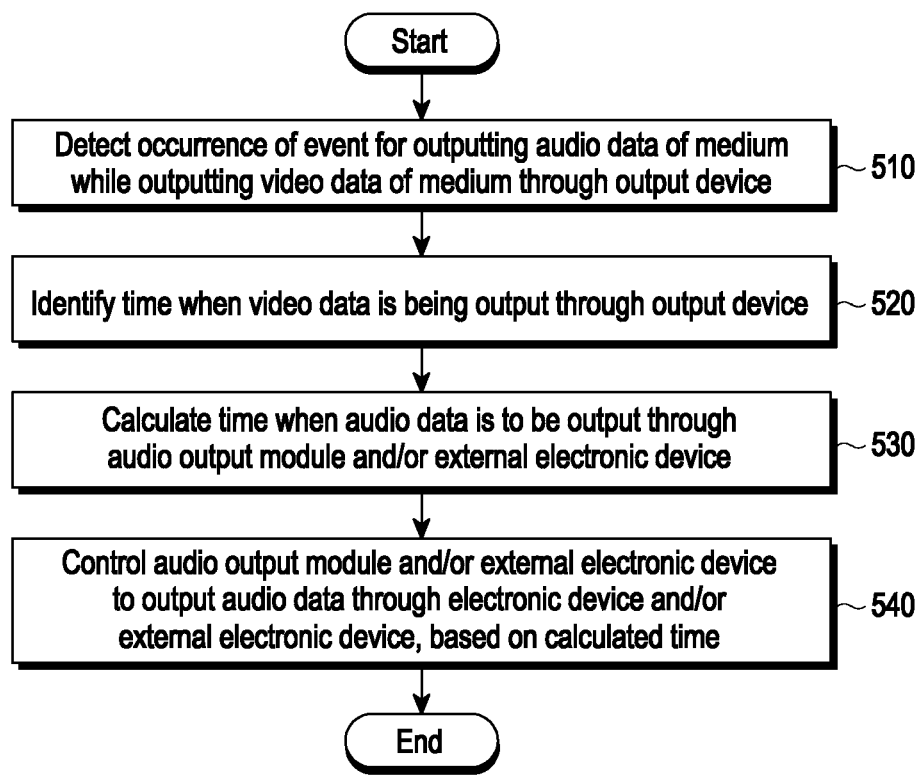
FIG. 5A to FIG. 5E are views illustrating embodiments of a function or operation of synchronizing audio data and video data.
Figure 5B:
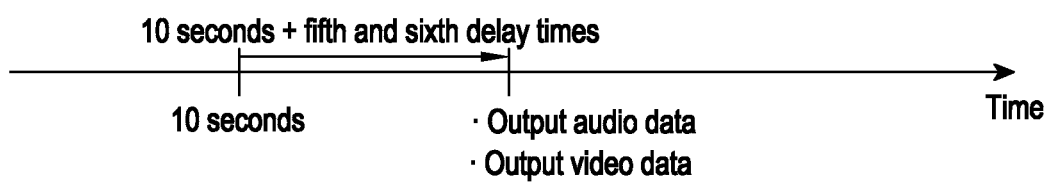

Referring to FIG. 5A, in operation 510, an electronic device 201 (e.g., the processor 220 of FIG. 2) in an embodiment of the disclosure may detect an event for outputting audio data of a medium (e.g., a user input to change to a configuration for outputting audio data) while outputting video data of the medium through an output device (e.g., the display module 260 or an external display device). In an embodiment of the disclosure, the electronic device 201 may output only the video data without outputting the audio data. In an embodiment, when only video data of a medium be output without outputting audio data of a medium on an execution screen of a predetermined application (e.g., a gallery application), only the video data of the medium may be output, for example.

In operation 520, the electronic device 201 in an embodiment of the disclosure may identify a time when the video data is being output through the output device. In an embodiment, when the event is detected at a time after a lapse of 10 seconds from an initial playback start time (e.g., 0 second) of the medium, the electronic device 201 in an embodiment of the disclosure may identify the time when the video data is being output through the output device as being "10 seconds", for example.

In operation 530, the electronic device 201 in an embodiment of the disclosure may calculate a time when the audio data is to be output through the audio output module 255 and/or an external electronic device. The electronic device 201 in an embodiment of the disclosure may determine a fifth delay time and a sixth delay time to calculate the time when the audio data is to be output through the electronic device 201 or the external electronic device.

The fifth delay time in an embodiment of the disclosure may be determined based on a delay time of an audio filter applied to the audio data. Information about an audio filter type and a delay time in an embodiment of the document may be stored in the electronic device 201 in the form of Table 4 below. The electronic device 201 in an embodiment of the disclosure may determine a delay time (e.g., the fifth delay time) corresponding to the audio filter applied to the audio data with reference to the information shown in Table 4. When a plurality of audio filters is used to output the audio data, the electronic device 201 in an embodiment of the disclosure may determine the fifth delay time by calculating the sum of delay times corresponding to the types of the used audio filter.

TABLE 4

| Audio filter type | Delay time |
| --- | --- |
| Spatial audio | 80 ms |
| High-quality audio | 20 ms |

The sixth delay time in an embodiment of the disclosure may be determined based on an audio data transmission delay time demanded for the output device to output the audio data. The audio data transmission delay time in an embodiment of the disclosure may denote a time (in other words, an output delay time) demanded when the audio data is transmitted to an audio output device. The electronic device 201 in an embodiment of the disclosure may determine the audio data transmission delay time (e.g., the sixth delay time) by referring to information shown in Table 5 below.

TABLE 5

| Audio output device | Delay time |
| --- | --- |
| Speaker of electronic device | 200 ms |
| Wired earphones of electronic device | 190 ms |
| Device supporting BT AVDTP 1.3 delay reporting | 450 ms |

The electronic device 201 in an embodiment of the disclosure may calculate the time when the audio data is to be output through the electronic device 201 or the external electronic device by Equation 4. The electronic device 201 in an embodiment of the disclosure may determine a time calculated through Equation 4 as the time when the audio data is to be output. In an embodiment of this document, audio data positioned at a time in which the delay times are reflected from a time when the event for outputting the audio data is detected (e.g., the time after a lapse of 10 seconds from the initial playback time (0 second) of the medium) may be determined as an output frame, thereby making it possible to output the video data without interruption.

Current output time of video data+Fifth delay time+ Sixth delay time [Equation 4]

In operation 540, the electronic device 201 in an embodiment of the disclosure may control the audio output module 255 and/or the external electronic device to output the audio data through the electronic device 201 and/or the external electronic device, based on the calculated time. Through this operation, the audio data positioned at the time in which the delay times are reflected from a time when a request to output audio data is obtained (e.g., the time after a lapse of 10 seconds from the initial time (0 second) of the medium) may be determined as output data or the output frame, thereby making it possible to output the video data without interruption.

Figure 5C:
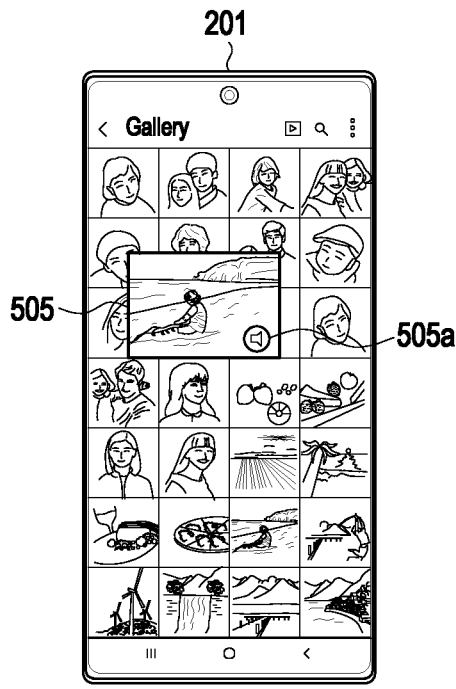
Figure 5D:
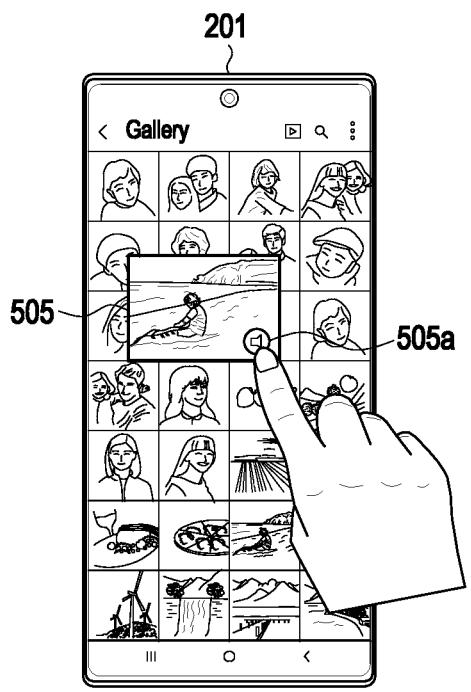
Figure 5E:
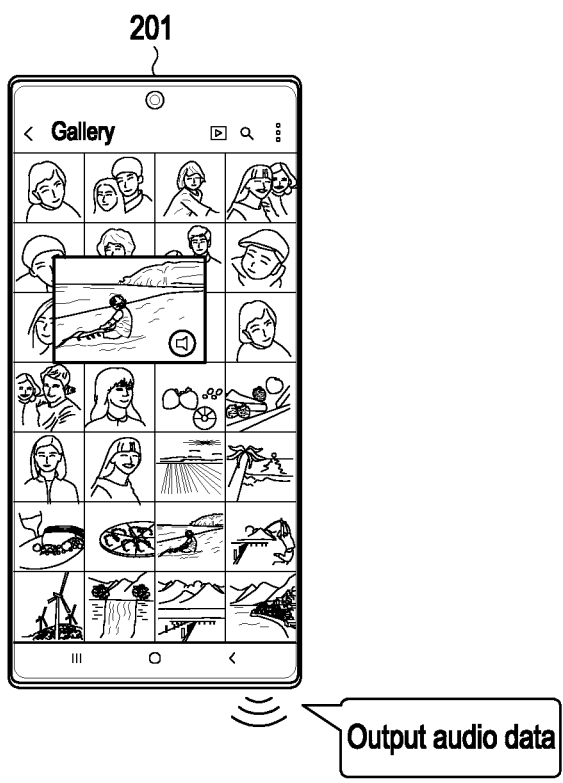

Referring to FIG. 5C, the electronic device 201 in an embodiment of the disclosure may play a video 505 in a predetermined application (e.g., a gallery application). In this case, the electronic device 201 in an embodiment of the disclosure may be in a state of not outputting audio data corresponding to the video 505. Referring to FIG. 5D, the electronic device 201 in an embodiment of the disclosure may detect occurrence of an event for outputting audio data (e.g., an input to select a graphic user interface 505a). Referring to FIG. 5E, when the occurrence of the event for outputting the audio data is detected, the electronic device 201 in an embodiment of the disclosure may output the audio data by a delay time (e.g., the fifth delay time and the sixth delay time), thereby outputting the audio data without interruption.

Figure 6A:
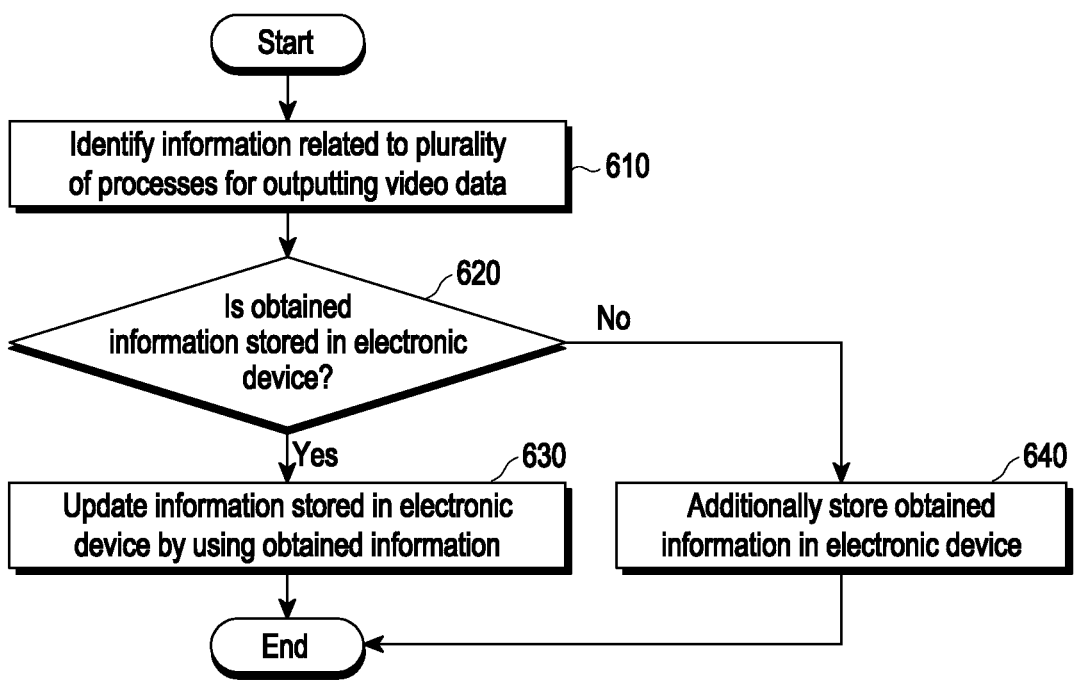
FIG. 6A and FIG. 6B are views illustrating embodiments of a function or operation of updating information demanded to synchronize audio data and video data.
Figure 6B:
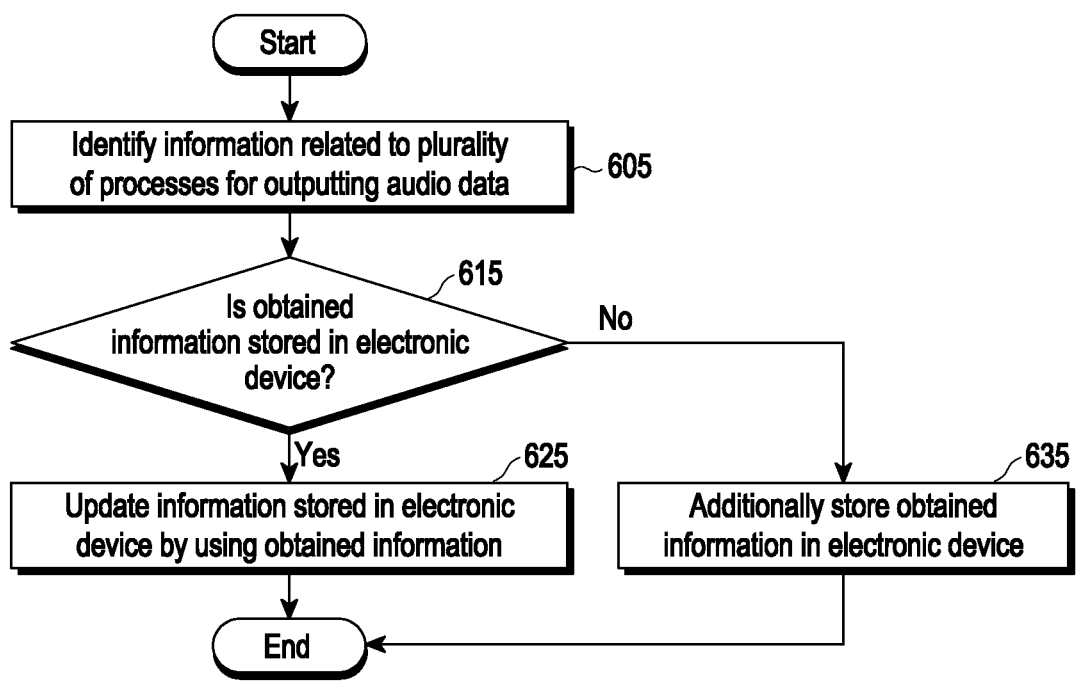

FIG. 6A and FIG. 6B are views illustrating a function or operation of updating information demanded to synchronize audio data and video data.

Referring to FIG. 6A, in operation 610, an electronic device 201 (e.g., the processor 220 of FIG. 2) in an embodiment of the disclosure may identify (or obtain) information related to a plurality of processes for outputting video data. The plurality of processes in an embodiment of the disclosure may include at least one of a decoding process, a filtering process, and a process of transmitting video data to an output device, for example. In an embodiment of the disclosure, the information related to the plurality of processes may include information about a processing time actually used by each of the plurality of processes for outputting the video data, information about the type of a decoder applied to the decoding process, information about the type of a filter applied to the filtering process (e.g., a process of applying a postprocessing effect to the video data), information about the type of an output device, and information about a property of the video data, such as the resolution of the video data.

In operation 620, the electronic device 201 in an embodiment of the disclosure may determine whether the information obtained in operation 610 is information stored in the electronic device 201. The electronic device 201 in an embodiment of the disclosure may determine whether the type of the decoder, the type of a video filter, and the type of the output device are information stored in the electronic device 201. To perform operation 620, the electronic device 201 in an embodiment of the disclosure may refer to Table 1 to Table 3.

When the information obtained in operation 610 is the information stored in the electronic device 201 (Yes in operation 620), the electronic device 201 in an embodiment of the disclosure may update the information (e.g. Table 1 to Table 3) stored in the electronic device 201 in operation 630. The electronic device 201 in an embodiment of the disclosure may calculate the average of information about a delay time previously stored and the information about the processing time actually used by each of the plurality of processes for outputting the video data, thereby updating the information (e.g. Table 1 to Table 3) stored in the electronic device 201. In an embodiment, when a filtering process for the video data is performed by an "object tracking" filter, in a case that the delay time previously stored in the electronic device 201 is 50 ms and it actually takes 52 ms to perform the filtering process, the electronic device 201 may update the delay time (e.g., the second delay time) to 51 ms, which is the average value 50 ms and 52 ms.

When the information obtained in operation 610 is not the information stored in the electronic device 201 (No in operation 620), the electronic device 201 in an embodiment of the disclosure may additionally store the information about the type and information about a delay time obtained in operation 610 in the electronic device 201 in operation 640. When a filtering process is performed by a filter other than those shown in Table 2, for example, the electronic device 201 in an embodiment of the disclosure may update the information (e.g. Table 1 to Table 3) stored in the electronic device 201 by adding the type of the video filter used in the filtering process and a used delay time to Table 2.

Referring to FIG. 6B, in operation 605, the electronic device 201 (e.g., the processor 220 of FIG. 2) in an embodiment of the disclosure may identify (or obtain) information related to a plurality of processes for outputting audio data. The plurality of processes in an embodiment of the disclosure may include at least one of a filtering process and a process of transmitting audio data to an output device, for example. In an embodiment of the disclosure, the information related to the plurality of processes may include information about a processing time actually used by each of the plurality of processes for outputting the audio data, information about the type of a filter applied to the filtering process (e.g., a process of applying a postprocessing effect to the audio data), and information about the type of an output device.

In operation 615, the electronic device 201 in an embodiment of the disclosure may determine whether the information obtained in operation 605 is information stored in the electronic device 201. The electronic device 201 in an embodiment of the disclosure may determine whether the type of an audio filter and the type of the output device are information stored in the electronic device 201. To perform operation 615, the electronic device 201 in an embodiment of the disclosure may refer to Table 4 and Table 5.

When the information obtained in operation 605 is the information stored in the electronic device 201 (Yes in operation 615), the electronic device 201 in an embodiment of the disclosure may update the information (e.g. Table 4 and Table 5) stored in the electronic device 201 in operation 625. The electronic device 201 in an embodiment of the disclosure may calculate the average of information about a delay time previously stored and the information about the processing time actually used by each of the plurality of processes for outputting the audio data, thereby updating the information (e.g. Table 4 and Table 5) stored in the electronic device 201. In an embodiment, when a filtering process for the audio data is performed by a "spatial audio" filter, in a case that the delay time previously stored in the electronic device 201 is 80 ms and it actually takes 82 ms to perform the filtering process, the electronic device 201 may update the delay time (e.g., the fifth delay time) to 81 ms, which is the average value 80 ms and 82 ms, for example.

When the information obtained in operation 605 is not the information stored in the electronic device 201 (No in operation 615), the electronic device 201 in an embodiment of the disclosure may additionally store the information about the type and information about a delay time obtained in operation 605 in the electronic device 201 in operation 635. In an embodiment, when a filtering process is performed by a filter other than those shown in Table 4, the electronic device 201 in an embodiment of the disclosure may update the information (e.g. Table 4 and/or Table 5)

stored in the electronic device 201 by adding the type of the audio filter used in the filtering process and a used delay time to Table 4, for example.

FIG. 7A to FIG. 7D are views illustrating an operation or function of correcting an error when the error occurs in the position of audio data.

Figure 7A:
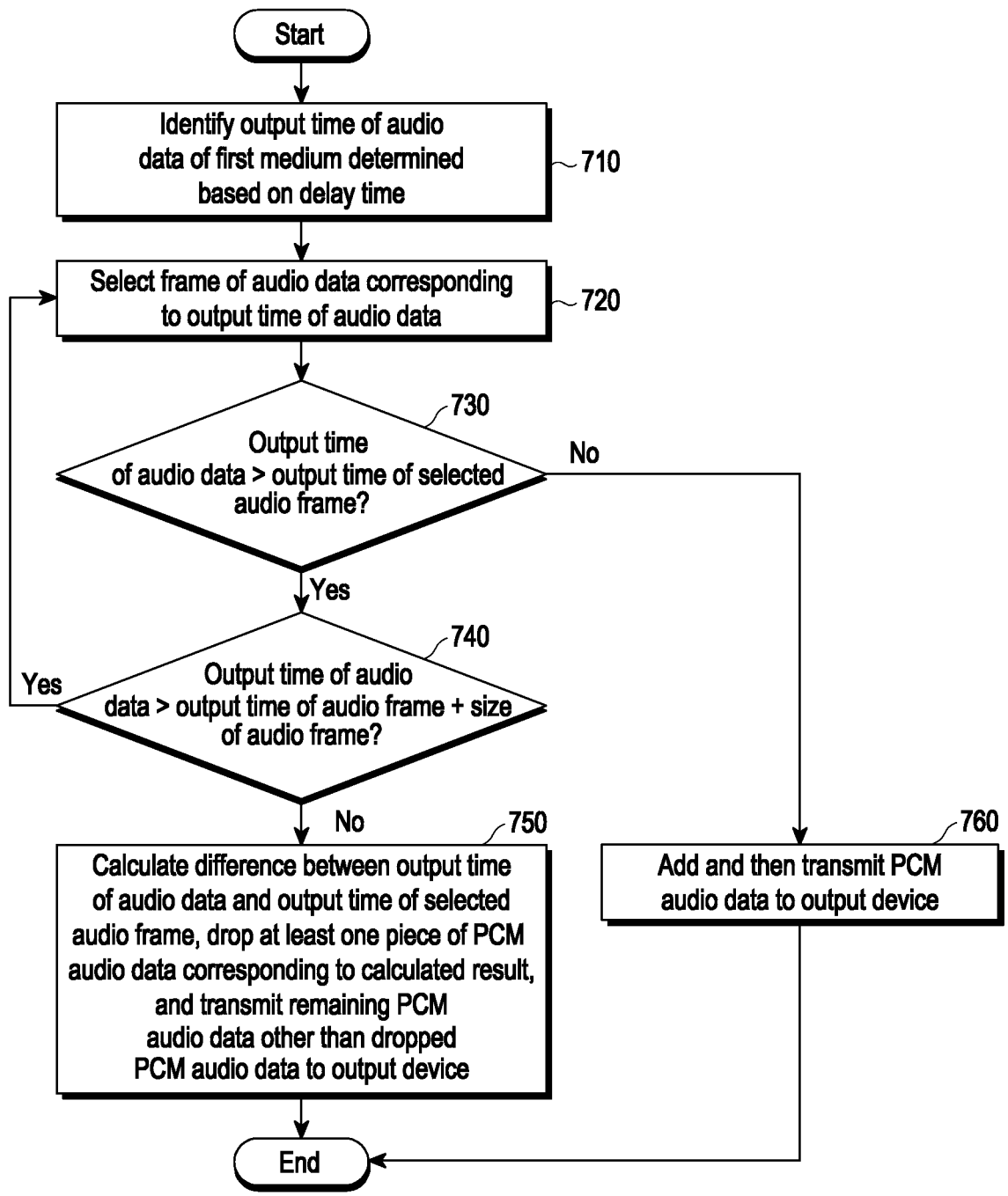
FIG. 7A to FIG. 7D are views illustrating embodiments of an operation or function of correcting an error when the error occurs in the position of audio data.

Referring to FIG. 7A, in operation 710, an electronic device (e.g., the processor 220 of FIG. 2) in an embodiment of the disclosure may identify an output time of audio data of a first medium determined based on a delay time. The delay time in an embodiment of the disclosure may refer to a delay time of audio data described with reference to FIG. 5A and FIG. 5B. The output time of the audio data in an embodiment of the disclosure may refer to an output time which is compensated for a delay time described with reference to FIG. 5A and FIG. 5B.

In operation 720, the electronic device (e.g., the electronic device 201 including the processor 220 of FIG. 2) in an embodiment of the disclosure may select a frame of the audio data (e.g., a third audio frame 925) corresponding to the output time of the audio data. Although the electronic device 201 in an embodiment of the disclosure may select an audio frame that matches the output time of the audio data (e.g., 10 seconds), the output time of the audio data and the time of the frame of the audio data frame (e.g., a start time of a predetermined audio frame or an output time of the audio data) may not exactly match. In an embodiment, the output time of the audio data which is compensated for the delay time may be 10 seconds, while the output time of the selected audio frame (e.g., the third audio frame 925) may be 9.95 seconds, for example. A group of PCM audio data (e.g., first PCM audio data 925a, second PCM audio data 925b, third PCM audio data 925c, fourth PCM audio data 925d, fifth PCM audio data 925e, and sixth PCM audio data 925f) in an embodiment of the disclosure may form one frame (e.g., the third audio frame 925), or a group of a plurality of frames (e.g., a first audio frame 905, a second audio frame 915, the third audio frame 925, and a first audio frame 935) may form one piece of audio data.

In operation 730, the electronic device (e.g., the electronic device 201 including the processor 220 of FIG. 2) in an embodiment of the disclosure may compare the output time of the audio data with the output time of the selected audio frame. In an embodiment, the electronic device 201 in an embodiment of the disclosure may compare the output time (e.g., 10 seconds) of the audio data which is compensated for the delay time with the output time (e.g. 9.95 seconds) of the selected audio frame (e.g., the third audio frame 925), for example.

When the output time of the audio data which is compensated for the delay time is later than the output time of the selected audio frame (Yes in operation 730) (e.g., when the output time of the audio data which is compensated for the delay time is 10 seconds and the output time of the selected audio frame is 9.95 seconds), the electronic device (e.g., the electronic device 201 including the processor 220 of FIG. 2) in an embodiment of the disclosure may compare the sum of the output time of the selected audio frame and the size (or length) of the selected audio frame with the output time of the audio data which is compensated for the delay time in operation 740. In an embodiment, when the size of the audio frame is 100 ms (sample rate: 44.1 kilohertz (KHz), number of channels: 2), the sum of the output time of the selected audio frame and the size (or length) of the selected audio frame is 10.05 seconds (e.g., 9.95 seconds+ 0.1 second) according to the disclosure, for example, and thus the electronic device 201 in an embodiment of the disclosure may determine that the output time of the audio data which is compensated for the delay time is a time earlier than the output time of the selected audio frame.

When the output time of the audio data which is compensated for the delay time is earlier than or equal to the output time of the selected audio frame (No in operation 740), the electronic device (e.g., the electronic device 201 including the processor 220 of FIG. 2) in an embodiment of the disclosure may calculate the difference between the output time of the audio data and the output time of the selected audio frame, may drop at least one piece of pulse-code modulation (PCM) audio data corresponding to a calculated result, and may transmit remaining PCM audio data other than the dropped PCM audio data to a speaker or an external electronic device in operation 750. In an embodiment of the disclosure, the difference between the output time of the audio data and the output time of the selected audio frame may be 50 ms, and the size (byte) of the at least one piece of PCM audio data corresponding to 50 ms may be determined by Equation 4 below.

$$((\text{Sampling rate} \times \text{Time difference}) \times \text{Bit width})/(8 \times \text{Number of channels}) \quad \text{[Equation 5]}$$

Figure 7B:
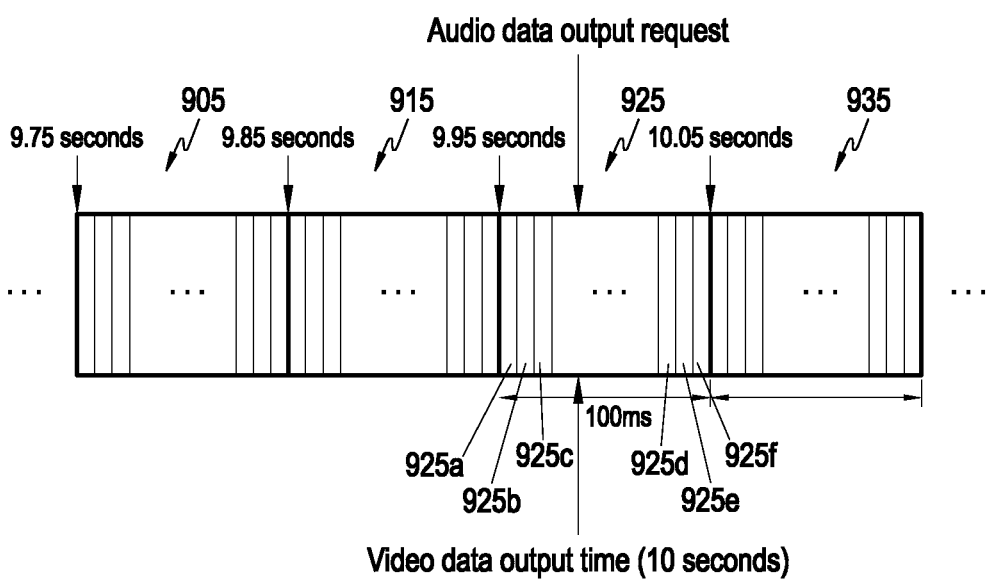
Figure 7C:
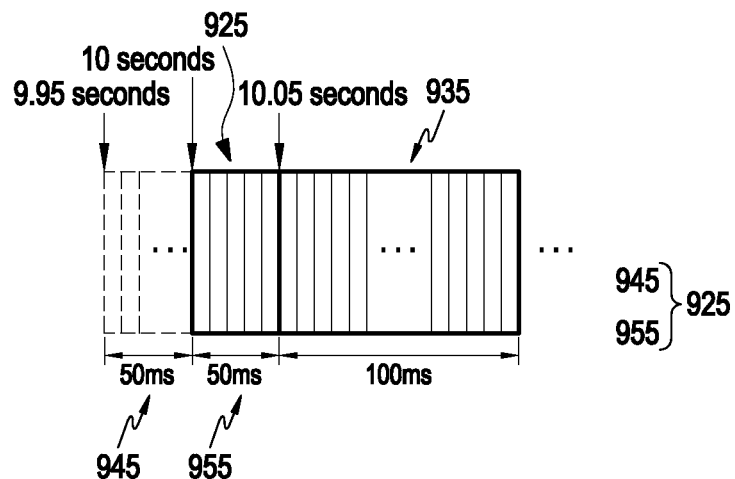

In Equation 5, "bit width" may denote the bit width of the audio data, and "Number of channels" may denote the number of channels of an output device (e.g., the speaker). "Time difference" may denote the difference between the output time of the audio data and the output time of the selected audio frame, and according to the disclosure, the time difference may be 50 ms. "Sampling rate" may be the sampling rate (e.g., 44.1 KHz) of the audio data. Referring to FIG. 7B and FIG. 7C, as shown in FIG. 7B, an audio frame (e.g., the third audio frame 925) having a frame start time of 9.95 seconds may be selected according to a user's audio data output request. In this case, when the size of at least one piece of PCM audio data calculated by the above equation is, e.g., a data size corresponding to 50 ms, the electronic device 201 in an embodiment of the disclosure may drop PCM data 945 corresponding to 50 ms from the selected audio frame as shown in FIG. 7C, and may transmit data 955 (and the fourth audio frame 935) after the dropped PCM data to the output device (e.g., the speaker). When the output time of the audio data which is compensated for the delay time is later than the output time of the selected audio frame (yes in operation 740), the electronic device (e.g., the electronic device 201 including the processor 220 of FIG. 2) in an embodiment of the disclosure may drop the selected audio frame, and may perform operation 720 and operations after operation 720 again.

Figure 7D:
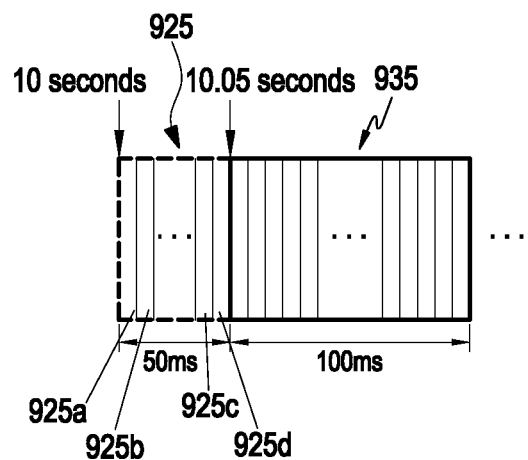

When the output time of the audio data which is compensated for the delay time is earlier than or equal to the output time of the selected audio frame (No in operation 730) (e.g., when the output time of the audio data which is compensated for the delay time is 10 seconds and the output time of the selected audio frame is 10.05 seconds), the electronic device (e.g., the electronic device 201 including the processor 220 of FIG. 2) in an embodiment of the disclosure may add PCM data corresponding to the difference between the output time of the audio data which is compensated for the delay time and the output time of the selected audio frame, and may then transmit the same to the output device (e.g., the speaker) in operation 760. In an embodiment, as shown in FIG. 7D, the electronic device (e.g., the electronic device 201 including the processor 220 of FIG. 2) in an embodiment of the disclosure may add the PCM data (e.g., the first PCM audio data 925a, the second PCM audio data 925b, the third PCM audio data 925c, and the fourth PCM audio data 925d) corresponding to the difference between the output time of the audio data which is compensated for the delay time and the output time of the selected audio frame to the front of the selected audio frame (e.g., the fourth audio frame 935), and may transmit audio frames to which the PCM data corresponding to the difference between the output time of the audio data which is compensated for the delay time and the output time of the selected audio frame to the output device, for example. Through this operation, even though the start time of the selected audio frame and the output time of the audio data which is compensated for the delay time are different, audio data matching the output time of the audio data which is compensated for the delay time may be transmitted to the output device.

Figure 8A:
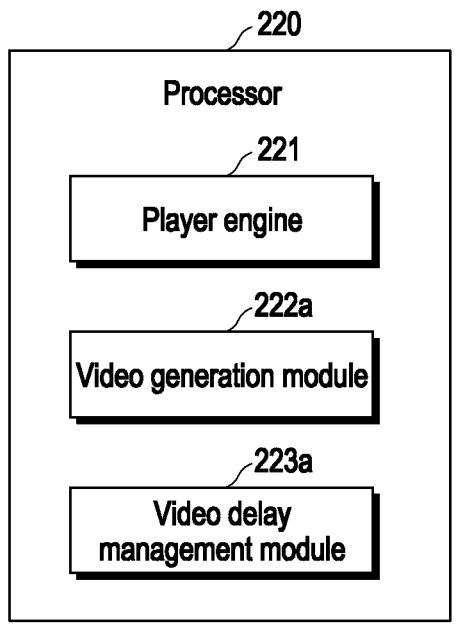
FIG. 8A and FIG. 8B are views illustrating embodiments of various modules included in a processor.
Figure 8B:
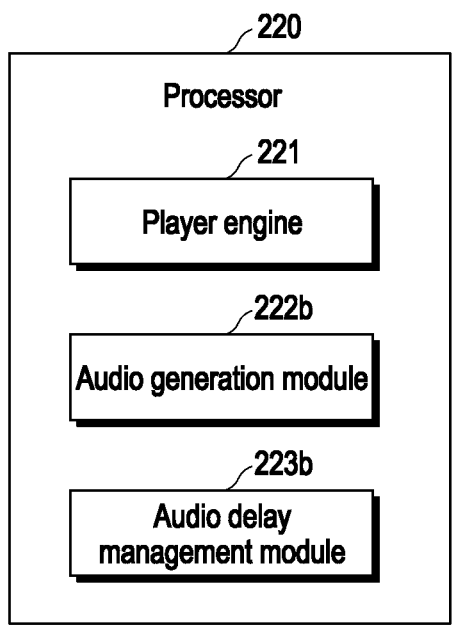

FIG. 8A and FIG. 8B are views illustrating various modules included in a processor 220.

Referring to FIG. 8A, the processor 220 in an embodiment of the disclosure may include at least one of a player engine 221, a video generation module 222a, and a video delay management module 223a. The player engine 221 in an embodiment of the disclosure may obtain information about audio data currently being output by the electronic device 201. The player engine 221 in an embodiment of the disclosure may transmit the obtained information about the audio data to the video generation module 222a. The player engine 221 in an embodiment of the disclosure may transmit a request for the video delay management module 223a to calculate the start position of video data to the video delay management module 223a. The request in an embodiment of the disclosure may include the width and height of video data, the type of a decoder, filter information, and information about the output time of the audio data currently being output. The video delay management module 223a in an embodiment of the disclosure may calculate at least one delay time (e.g., a first delay time, a second delay time, a third delay time, and a fourth delay time). The video delay management module 223a in an embodiment of the disclosure may obtain the time of a previous sync frame (e.g., a second sync frame 305b) closest to a current playback time of the electronic device 201 (e.g., a time when a video data output request event is detected), and may transmit the time to the video generation module 222a. The video delay management module 223a in an embodiment of the disclosure may transmit information about the at least one calculated delay time to the player engine 221. The player engine 221 in an embodiment of the disclosure may determine the output time of the video data by the information about the at least one delay time received from the video delay management module 223a. The player module 221 in an embodiment of the disclosure may transmit information about the determined output time of the video data to the video generation module 222a. The video generation module 222a in an embodiment of the disclosure may decode at least one video frame corresponding to the output time by the information about the output time of the video data received from the player engine 221, and may output decoded video data through the electronic device 201 or an external electronic device.

Referring to FIG. 8B, the processor 220 in an embodiment of the disclosure may include at least one of a player engine 221, an audio generation module 222b, and an audio delay management module 223b. The player engine 221 in an embodiment of the disclosure may obtain information about video data currently being output by the electronic device 201. The player engine 221 in an embodiment of the disclosure may transmit the obtained information about the video data to the audio generation module 222b. The player engine 221 in an embodiment of the disclosure may transmit a request for the audio delay management module 223b to calculate the start position of audio data to the audio delay management module 223b. The request in an embodiment of the disclosure may include filter information and information about the output time of the video data currently being output. The audio delay management module 223b in an embodiment of the disclosure may calculate at least one delay time (e.g., a fifth delay time and a sixth delay time). The audio delay management module 223b in an embodiment of the disclosure may transmit information about the at least one calculated delay time to the player engine 221. The player engine 221 in an embodiment of the disclosure may determine the output time of the audio data by the information about the at least one delay time received from the audio delay management module 223b. The player engine (also referred to as a player module) 221 in an embodiment of the disclosure may transmit information about the determined output time of the audio data to the audio generation module 222b. The audio generation module 222b in an embodiment of the disclosure may decode at least one audio frame corresponding to the output time by the information about the output time of the audio data received from the player engine 221, and may output decoded audio data through the electronic device 201 or an external electronic device. A function or operation of selecting a frame (e.g., the third audio frame 925) of audio data in an embodiment of the disclosure may be performed, e.g., by the player engine 221.

When video data is additionally output while a plurality of pieces of audio data is output respectively through a plurality of devices, the electronic device 201 in an embodiment of the disclosure may calculate a delay time described above for each device, thereby outputting the video data. In an embodiment, when audio data is output through the electronic device 201 and an external electronic device (e.g., a television (TV) mirroring a screen of the electronic device 201), the electronic device 201 may calculate a first delay time, a second delay time, a third delay time, and a fourth delay time for the electronic device 201, and may separately calculate a first delay time, a second delay time, a third delay time, and a fourth delay time for the external electronic device, for example. The electronic device 201 in an embodiment of the disclosure may determine the output time of video data to be output from each device, based on each calculated delay time. In this case, according to the disclosure, a network delay time demanded to transmit the video data to the external electronic device may be further taken into consideration. Information on the network delay time in an embodiment of the disclosure may be stored in advance in the electronic device 201 in the form of a mapping table. As described above, according to the disclosure, even when audio data and/or video data are output respectively through a plurality of devices, the audio data and/or the video data may be output in consideration of a delay time for each device, thereby making it is possible to output data without interruption.

Although processing audio data and processing video data are separately described in FIG. 8A and FIG. 8B, at least one module may be integrated and implemented according to the disclosure. In an embodiment, the video generation module 222a and the audio generation module 222b may be integrated and implemented as one medium generation module (not shown), for example. Further, the video delay management module 223a and the audio delay management module 223b may be integrated and implemented as one delay management module (not shown). The video delay management module 223a in an embodiment of the disclosure may identify (or obtain) information related to a plurality of processes for outputting video data. The plurality of processes in an embodiment of the disclosure may include at least one of a decoding process, a filtering process, and a process of transmitting video data to an output device, for example. In an embodiment of the disclosure, the information related to the plurality of processes may include information about a processing time actually used by each of the plurality of processes for outputting the video data, information about the type of a decoder applied to the decoding process, information about the type of a filter applied to the filtering process (e.g., a process of applying a postprocessing effect to the video data), information about the type of an output device, and information about a property of the video data, such as the resolution of the video data.

The video delay management module 223a in an embodiment of the disclosure may determine whether the obtained information is information stored in the electronic device 201. The electronic device 201 in an embodiment of the disclosure may determine whether the type of the decoder, the type of a video filter, and the type of the output device are information stored in the electronic device 201. To this end, the video delay management module 223a in an embodiment of the disclosure may refer to Table 1 to Table 3.

When the obtained information is the information stored in the electronic device 201, the video delay management module 223a in an embodiment of the disclosure may update the information (e.g. Table 1 to Table 3) stored in the electronic device 201. The video delay management module 223a in an embodiment of the disclosure may calculate the average of information about a delay time previously stored and the information about the processing time actually used by each of the plurality of processes for outputting the video data, thereby updating the information (e.g. Table 1 to Table 3) stored in the electronic device 201. In an embodiment, when a filtering process for the video data is performed by an "object tracking" filter, in a case that the delay time previously stored in the electronic device 201 is 50 ms and it actually takes 52 ms to perform the filtering process, the video delay management module 223a may update the delay time (e.g., the second delay time) to 51 ms, which is the average value 50 ms and 52 ms. In this case, the video delay management module 223a may further perform an operation of determining whether the time actually taken to perform the filtering process (e.g., 52 ms) is within a predetermined error range. When the time actually taken to perform the filtering process (e.g., 52 ms) is within the predetermined error range, the video delay management module 223a in an embodiment of the disclosure may update the delay time (e.g., the second delay time) to 51 ms, which is the average value 50 ms and 52 ms. However, when the time actually taken to perform the filtering process (e.g., 52 ms) is not within the predetermined error range, the video delay management module 223a in an embodiment of the disclosure may maintain the previously stored delay time (e.g., the second delay time) of 50 ms. In an embodiment of the disclosure, the video delay management module 223a may obtain information about a delay time from another external electronic device (e.g., a cloud server), thereby updating the information (e.g. Table 1 to Table 3) stored in the electronic device 201.

When the obtained information is not the information stored in the electronic device 201, the video delay management module 223a in an embodiment of the disclosure may additionally store the obtained information about the type and information about a delay time in the electronic device 201. In an embodiment, when a filtering process is performed by a filter other than those shown in Table 2, the video delay management module 223a in an embodiment of the disclosure may update the information (e.g. Table 1 to Table 3) stored in the electronic device 201 by adding the type of the video filter used in the filtering process and a used delay time to Table 2, for example.

In an embodiment of the disclosure, various embodiments of the disclosure described above may be applied even when an external electronic device (e.g., AR glasses or a head-mounted device (HMD)) is operatively connected to the electronic device 201. In an embodiment, a delay time demanded to process sensor information (e.g., a depth value of an object, a hovering height value, or a motion level of a motion sensor) to be measured may be calculated, and audio data and/or video data may be output based on the calculated delay time. In an embodiment of the disclosure, information about the delay time demanded to process the sensor information (e.g., the depth value of the object, the hovering height value, or the motion level of the motion sensor) may be previously stored in the electronic device 201. In an alternative embodiment, when a sensor module is turned off or fails to detect a user's gaze (e.g., when the user detaches the external electronic device from the body) while outputting video data or audio data through the external electronic device and may then is turned back on or is switched to a state of being able to detect the user's gaze (e.g., when the user wears the external electronic device back), various embodiments of the disclosure may be applied, for example. In this case, an event for outputting video data or audio data may be an event for the sensor module switching to an on state or an event for detecting the external electronic device being worn back. The electronic device 201 or the external electronic device in an embodiment of the disclosure may detect the event for detecting the external electronic device being worn back while audio data is output through the electronic device 201 or the external electronic device. The electronic device 201 in an embodiment of the disclosure may identify a time when the audio data is output through an output device, and may calculate a time when video data is to be output through the electronic device 201 or the external electronic device. The electronic device 201 in an embodiment of the disclosure may control the external electronic device to output the video data through the electronic device 201 or the external electronic device, based on the calculated time.

An electronic device in an embodiment of the disclosure may include a touchscreen display (e.g., the display module 260 of FIG. 2), at least one speaker (e.g., the audio output module 255 of FIG. 2), and at least one processor (e.g., the processor 220 of FIG. 2). The at least one processor may obtain a user input to output video data of a first medium while outputting audio data of the first medium through the at least one speaker, identify a time when the audio data is output through the at least one speaker, based on the obtained user input, calculate a time when the video data is to be output through the touchscreen display or an external electronic device, at least based on the identified time, and control the touchscreen display or the external electronic device such that the video data is output through the touchscreen display or the external electronic device at the determined time, based on the calculated time.

The at least one processor may determine a first delay time to calculate the time when the video data is to be output through the touchscreen display or the external electronic device, and the first delay time may be determined based on a time corresponding to a position of a previous sync frame (e.g., the second sync frame 305b) closest to a time when the audio data is output through the at least one speaker, a maximum frames per second (FPS) of a decoder for decoding the video data, an FPS of the video data, and the time when the audio data is output through the at least one speaker.

The at least one processor may determine a second delay time to calculate the time when the video data is to be output through the touchscreen display or the external electronic device, and the second delay time may be determined based on a delay time of at least one video filter applied to the video data.

The at least one processor may determine the second delay time by adding delay times of a plurality of video filters when the at least one video filter includes the plurality of video filters.

The at least one processor may determine a third delay time to calculate the time when the video data is to be output through the touchscreen display or the external electronic device, and the third delay time may include a video data transmission delay time demanded by the touchscreen display or the external electronic device to output the video data.

The at least one processor may determine a fourth delay time to calculate the time when the video data is to be output through the touchscreen display or the external electronic device, and the fourth delay time may be determined based on a value of a sum of the first delay time, the second delay time, and the third delay time multiplied by the FPS of the video data divided by the maximum FPS of the decoder.

The at least one processor may determine a sum of a sum of the first delay time, the second delay time, the third delay time, and the fourth delay time and the time when the audio data is output through the at least one speaker as the time when the video data is to be output through the touchscreen display or the external electronic device.

The electronic device may further include at least one memory which stores information demanded to determine at least one delay time of the first delay time, the second delay time, the third delay time, and the fourth delay time and each delay time in advance, and the at least one processor may update each delay time stored in advance in the at least one memory, based on information about a processing time actually taken by each of a plurality of processes for outputting the video data.

The at least one processor may update each delay time by calculating an average of an actually taken processing time and each delay time stored in advance.

The at least one processor may obtain information about a video codec, a video filter, and a type of the external electronic device used for each of the plurality of processes.

The at least one processor may update the information demanded to determine the at least one delay time and stored in the at least one memory by the obtained information about the video codec, the video filter, and the type of the external electronic device.

An electronic device in an embodiment of the disclosure may include a touchscreen display (e.g., the display module 260 of FIG. 2), at least one speaker (e.g., the audio output module 255 of FIG. 2), and at least one processor (e.g., the processor 220 of FIG. 2). The at least one processor may obtain a user input to output audio data of a first medium while outputting video data of the first medium through the touchscreen display, identify a time when the video data is output through the touchscreen display, based on the obtained user input, calculate a time when the audio data is to be output through the at least one speaker or an external electronic device, output the video data through the touchscreen display, based on the identified time and the calculated time, and control the at least one speaker or the external electronic device such that the audio data is output through the at least one speaker or the external electronic device.

The at least one processor may determine a fifth delay time to calculate the time when the audio data is to be output through the at least one speaker or the external electronic device, and the fifth delay time may be determined based on a delay time of an audio filter applied to the audio data.

The at least one processor may determine a sixth delay time to calculate the time when the audio data is to be output through the at least one speaker or the external electronic device, and the sixth delay time may be determined based on an audio data transmission delay time demanded by the at least one speaker or the external electronic device to output the audio data.

The at least one processor may determine a sum of a sum of the fifth delay time and the sixth delay time and the time when the video data is output through the touchscreen display as the time when the audio data is to be output through the at least one speaker or the external electronic device.

The electronic device may include at least one memory which stores information demanded to determine at least one delay time of the fifth delay time and the sixth delay time in advance, and the at least one processor may store at least one delay time among the determined delay time in the at least one memory to update the demanded information stored in advance in the at least one memory.

An electronic device in an embodiment of the disclosure may include at least one speaker (e.g., the audio output module 255 of FIG. 2) and at least one processor. The at least one processor may identify an output time of audio data of a first medium determined based on a delay time (e.g., the fifth delay time and the sixth delay time); select a frame (e.g., the first audio frame 905, the second audio frame 915, the third audio frame 925, and the fourth audio frame 935) of the audio data corresponding to the output time, the frame including a plurality of pieces of pulse-code modulation (PCM) audio data (e.g., the first PCM audio data 925a, the second PCM audio data 925b, the third PCM audio data 925c, the fourth PCM audio data 925d, the fifth PCM audio data 925e, and the sixth PCM audio data 925f); obtain a first comparison result of comparing the output time and an output time of the selected frame; obtain a second comparison result of comparing a sum of the output time of the selected frame and a size of the frame with the output time, and drop the selected frame in response to the obtained second comparison result when the output time is later than the sum of the output time of the selected frame and the size of the frame, in response to the obtained first comparison result when the output time is later than the output time of the selected frame; and calculate a difference between the output time and the output time of the selected frame, drop at least one piece of PCM audio data corresponding to a calculation result among the plurality of pieces of PCM audio data, and transmit remaining PCM audio data other than the dropped PCM audio data among the plurality of pieces of PCM audio data to the at least one speaker or an external electronic device, in response to the obtained first comparison result when the output time is earlier than or equal to the output time of the selected frame.

The delay time may be determined based on a delay time of an audio filter applied to the audio data and an audio data transmission delay time demanded by the at least one speaker or the external electronic device to output the audio data.

The at least one processor may determine a size of the dropped at least one piece of PCM audio data, based on a sampling rate of the audio data, a bit width of the audio data, and a number of channels of the at least one speaker or the external electronic device, in response to the obtained second comparison result when the output time is earlier than or equal to the sum of the output time of the selected frame and the size of the frame.

The at least one processor may reselect the frame of the audio data corresponding to the output time, in response to the obtained second comparison result, when the output time is later than the sum of the output time of the selected frame and the size of the frame.

The electronic device in various embodiments may be one of various types of electronic devices. The electronic devices may include a portable communication device (e.g., a smartphone), a computer device, a portable multimedia device, a portable medical device, a camera, a wearable device, or a home appliance, for example. In an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B", "at least one of A and B", "at least one of A or B", "A, B, or C", "at least one of A, B, and C", and "at least one of A, B, or C", may include any one of, or all possible combinations of the items enumerated together in a corresponding one of the phrases. As used herein, such terms as "1st" and "2nd", or "first" and "second" may be used to simply distinguish a corresponding component from another, and does not limit the components in other feature (e.g., importance or order). It is to be understood that if an element (e.g., a first element) is referred to, with or without the term "operatively" or "communicatively", as "coupled with", "coupled to", "connected with", or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, e.g., "logic", "logic block", "part", or "circuitry". A module may be a single integral component, or a minimum unit or part thereof, adapted to perform one or more functions. In an embodiment, in an embodiment, the module may be implemented in a form of an application-specific integrated circuit (ASIC), for example.

Various embodiments as set forth herein may be implemented as software (e.g., the program 240) including one or more instructions that are stored in a storage medium (e.g., internal memory 236 or external memory 238) that is readable by a machine (e.g., the electronic device 201). In an embodiment, a processor (e.g., the processor 220) of the machine (e.g., the electronic device 201) may invoke at least one of the one or more instructions stored in the storage medium, and execute it, for example. This allows the machine to be operated to perform at least one function according to the at least one instruction invoked. The one or more instructions may include a code generated by a complier or a code executable by an interpreter. The machine-readable storage medium may be provided in the form of a non-transitory storage medium. The term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

In an embodiment, a method in various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

In various embodiments, each component (e.g., a module or a program) of the above-described components may include a single entity or multiple entities, and some of the multiple entities may be separately disposed in different components. In various embodiments, one or more of the above-described components or operations may be omitted, or one or more other components or operations may be added. In an alternative or additional embodiment, a plurality of components (e.g., modules or programs) may be integrated into a single component. In such a case, the integrated component may still perform one or more functions of each of the plurality of components in the same or similar manner as they are performed by a corresponding one of the plurality of components before the integration. In various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device, comprising:
   a touchscreen display;
   a speaker; and
   a processor,
   wherein the processor is configured to:
      obtain a user input to output video data of a first content while outputting audio data of the first content through the speaker; and
      based on the user input:
         identify a time point that the audio data is output through the speaker;
         determine a time point that the video data is to be output through the touchscreen display or an external electronic device by a plurality of delay times calculated at least based on the identified time, wherein the plurality of delay times are determined based on at least one of a position of a previous sync frame closest to a time in which the audio data is output through the speaker, a delay time of at least one video filter applied to the video data, or a video data transmission delay time demanded by the touchscreen display or the external electronic device to output the video data; and control the touchscreen display or the external electronic device such that the video data is output through the touchscreen display or the external electronic device at the determined time.

2. The electronic device of claim 1, wherein the processor is further configured to determine a first delay time of the plurality of delay times to calculate the time point that the video data is to be output through the touchscreen display or the external electronic device, and the first delay time is determined based on a time corresponding to a position of the previous sync frame closest to the time in which the audio data is output through the speaker, a maximum frames per second of a decoder which decodes the video data, a frames per second of the video data, and the time in which the audio data is output through the speaker.

3. The electronic device of claim 2, wherein the processor is further configured to determine a second delay time of the plurality of delay times to calculate the time in which the video data is to be output through the touchscreen display or the external electronic device, and the second delay time is determined based on the delay time of the at least one video filter applied to the video data.

4. The electronic device of claim 3, wherein the processor is further configured to determine the second delay time by adding delay times of a plurality of video filters in case that the at least one video filter comprises the plurality of video filters.

5. The electronic device of claim 4, wherein the processor is further configured to determine a third delay time of in the plurality of delay times to calculate the time in which the video data is to be output through the touchscreen display or the external electronic device, and the third delay time comprises the video data transmission delay time demanded by the touchscreen display or the external electronic device to output the video data.

6. The electronic device of claim 5, wherein the processor is further configured to determine a fourth delay time of the plurality of delay time to calculate the time in which the video data is to be output through the touchscreen display or the external electronic device, and the fourth delay time is determined based on a value of a sum of the first delay time, the second delay time, and the third delay time multiplied by the frames per second of the video data divided by the maximum frames per second of the decoder.

7. The electronic device of claim 6, wherein the processor is further configured to determine a sum of a sum of the first delay time, the second delay time, the third delay time, and the fourth delay time and the time in which the audio data is output through the speaker as the time in which the video data is to be output through the touchscreen display or the external electronic device.

8. The electronic device of claim 6, further comprising a memory configured to store information demanded to determine at least one delay time of the first delay time, the second delay time, the third delay time, and the fourth delay time and each delay time in advance, wherein the processor is further configured to update each delay time stored in advance in the memory, based on information about a processing time actually taken by each of a plurality of processes which output the video data.

9. The electronic device of claim 8, wherein the processor is further configured to update each delay time by calculating an average of an actually taken processing time and each delay time stored in advance.

10. The electronic device of claim 8, wherein the processor is further configured to obtain information about a video codec, a video filter, and a type of the external electronic device used for each of the plurality of processes.

11. The electronic device of claim 10, wherein the processor is further configured to update the information demanded to determine the at least one delay time and stored in the memory by obtained information about the video codec, the video filter, and the type of the external electronic device.

12. An electronic device, comprising:
a speaker; and
a processor,
wherein the processor is configured to:
identify an output time of audio data of a first content determined based on a delay time;
select a frame of the audio data corresponding to the output time, the frame comprising a plurality of pieces of pulse-code modulation audio data;
obtain a first comparison result of comparing the output time and an output time of a selected frame;
in response to the first comparison result, in case that the output time is later than the output time of the selected frame:
obtain a second comparison result of comparing a sum of the output time of the selected frame and a size of the frame with the output time, and
drop the selected frame in response to the second comparison result in case that the output time is later than the sum of the output time of the selected frame and the size of the frame; and
in response to the first comparison result, in case that the output time is earlier than or equal to the output time of the selected frame:
calculate a difference between the output time and the output time of the selected frame;
drop at least one piece of the pulse-code modulation audio data corresponding to a calculation result among the plurality of pieces of the pulse-code modulation audio data; and
transmit remaining pulse-code modulation audio data other than dropped at least one piece of the pulse-code modulation audio data among the plurality of pieces of the pulse-code modulation audio data to the speaker or an external electronic device.

13. The electronic device of claim 12, wherein the delay time is determined based on a delay time of an audio filter applied to the audio data and an audio data transmission delay time demanded by the speaker or the external electronic device to output the audio data.

14. The electronic device of claim 12, wherein the processor is further configured to determine a size of the dropped at least one piece of the pulse-code modulation audio data, based on a sampling rate of the audio data, a bit width of the audio data, and a number of channels of the speaker or the external electronic device, in response to the second comparison result in case that the output time is earlier than or equal to the sum of the output time of the selected frame and the size of the frame.

15. The electronic device of claim 12, wherein the processor is further configured to reselect the frame of the audio data corresponding to the output time, in response to the second comparison result, in case that the output time is later than the sum of the output time of the selected frame and the size of the frame.

* * * * *